United States Patent
Andou et al.

(10) Patent No.: US 9,233,608 B2
(45) Date of Patent: Jan. 12, 2016

(54) VEHICLE DRIVE DEVICE

(71) Applicant: HONDA MOTOR CO., LTD., Tokyo (JP)

(72) Inventors: Satoshi Andou, Utsunomiya (JP); Masayuki Kikuchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 13/944,408

(22) Filed: Jul. 17, 2013

(65) Prior Publication Data

US 2014/0025241 A1 Jan. 23, 2014

(30) Foreign Application Priority Data

Jul. 18, 2012 (JP) ................. 2012-159722

(51) Int. Cl.
| | |
|---|---|
| B60K 28/16 | (2006.01) |
| B60K 7/00 | (2006.01) |
| B60K 17/04 | (2006.01) |
| B60K 17/356 | (2006.01) |

(52) U.S. Cl.
CPC ............. *B60K 28/16* (2013.01); *B60K 7/0007* (2013.01); *B60K 17/046* (2013.01); *B60K 17/356* (2013.01); *B60K 2007/0092* (2013.01); *B60W 2520/26* (2013.01); *B60W 2520/266* (2013.01); *B60W 2710/083* (2013.01); *B60W 2720/30* (2013.01); *Y02T 10/7258* (2013.01)

(58) Field of Classification Search
CPC .... B60K 28/16; B60K 17/046; B60K 17/356; B60W 2520/26; B60W 2520/266; B60W 2520/30; Y02T 10/7258
See application file for complete search history.

(56) References Cited

U.S. PATENT DOCUMENTS

| | | | |
|---|---|---|---|
| 5,287,941 A * | 2/1994 | Masuda et al. | 180/197 |
| 6,909,959 B2 * | 6/2005 | Hallowell | 701/88 |

(Continued)

FOREIGN PATENT DOCUMENTS

| | | |
|---|---|---|
| JP | 1996-182118 | 7/1996 |
| JP | 2005073458 | 3/2005 |

(Continued)

*Primary Examiner* — Helal A Algahaim
*Assistant Examiner* — Donald J Wallace
(74) *Attorney, Agent, or Firm* — Honda Patents & Technologies North America, LLC; Suzanne B. Gagnon

(57) ABSTRACT

When both a left rear wheel and a right rear wheel are driven by first and second electric motors, and acceleration slippage occurs at either the left wheel or the right wheel, the acceleration slippage is reduced by decreasing the command motor torque (power drive torque) of the first or second electric motor connected to the wheel at which acceleration slippage was generated. The command motor torque of the first or second electric motor connected to the other wheel (wheel on the other side) on the right or left side that is opposite the wheel at which slippage occurred is increased, thereby making it possible to supplement the decrease in the driving torque of the wheel at which slippage occurred.

18 Claims, 23 Drawing Sheets

(56) References Cited

U.S. PATENT DOCUMENTS

| | | | |
|---|---|---|---|
| 7,386,379 B2* | 6/2008 | Naik et al. | 701/41 |
| 7,440,834 B2 | 10/2008 | Yamaguchi et al. | |
| 7,974,761 B2* | 7/2011 | Maeda et al. | 701/70 |
| 8,655,563 B2* | 2/2014 | Maeda et al. | 701/70 |
| 8,751,131 B2* | 6/2014 | Reynolds et al. | 701/84 |
| 8,849,537 B2* | 9/2014 | Yoon | 701/82 |
| 2002/0023791 A1* | 2/2002 | Kima et al. | 180/65.5 |
| 2003/0229439 A1* | 12/2003 | Polzin | 701/82 |
| 2005/0228554 A1* | 10/2005 | Yamamoto et al. | 701/22 |
| 2008/0221766 A1* | 9/2008 | Maeda et al. | 701/70 |
| 2011/0307129 A1* | 12/2011 | Yu et al. | 701/22 |
| 2012/0116641 A1* | 5/2012 | Crosman et al. | 701/84 |
| 2015/0005988 A1* | 1/2015 | Cox | 701/3 |

FOREIGN PATENT DOCUMENTS

| | | |
|---|---|---|
| JP | 2005329861 | 12/2005 |
| JP | 2006-094679 | 4/2006 |

* cited by examiner

| VEHICLE STATE | FRONT UNIT | REAR UNIT | REAR MOTOR | OWC | BRK |
|---|---|---|---|---|---|
| STOPPED | × | × | STOPPED | OFF | OFF |
| ADVANCING AT LOW VEHICLE SPEED | × | ○ | POWER DRIVE | ON | ON (WEAKLY FASTENED) |
| ADVANCING AT MEDIUM VEHICLE SPEED | ○ | × | STOPPED | OFF | ON (WEAKLY FASTENED) |
| DECELERATION REGENERATION | ○ | ○ | REGENERATIVE DRIVE | OFF | ON |
| ACCELERATION | ○ | ○ | POWER DRIVE | ON | ON (WEAKLY FASTENED) |
| ADVANCING AT HIGH VEHICLE SPEED | ○ | × | STOPPED | OFF | OFF |
| REVERSE RUNNING | × | ○ | REVERSE POWER DRIVE | OFF | ON |

FIG. 4

VEHICLE DRIVE DEVICE

CROSS REFERENCE TO RELATED APPLICATIONS

The present application claims priority under 35 U.S.C. §119 to Japanese Patent Application No. 2012-159722, filed Jul. 18, 2012, entitled "Vehicle Drive Device," the contents of which are incorporated herein by reference in their entirety.

BACKGROUND

The present disclosure pertains to a vehicle drive device.

In one known system, a drive controller for an electric vehicle is provided with a slip detection apparatus that calculates the acceleration of the vehicle wheels from the rotation speed of a drive motor, and determines the presence of wheel slippage from the wheel acceleration. The acceleration of the vehicle body based on the torque command value of the drive motor is then determined. A torque control apparatus reduces the torque of the torque command value sent to the drive motor when the presence of wheel slippage is determined by the slip detection apparatus. The torque control apparatus also implements control such that the torque command value sent to the drive motor becomes a normal running command value according to the operation amount of the accelerator pedal when slippage of the wheels is not detected by the slip detection apparatus. Thereby, smooth running is targeted on a road having low frictional resistance.

Incidentally, it is also known that a transaxle containing a speed reducer and a differential gear is connected to the drive motor mounted in the electric vehicle. The driving force of the drive motor that is input into the transaxle is distributed to the left front wheel and the right front wheel via left and right front wheel axles. Accordingly, on split-μ roads having different road surface friction on the left and right sides of a vehicle, and the like, when the presence of slippage of the left front wheel or the right front wheel is detected by the slip detection apparatus, the drive controller reduces the torque of the torque command value sent to the drive motor. Therefore, both the torque distributed to the left front wheel and the torque distributed to the right front wheel are reduced. In other words, the total drive torque of the front wheels is reduced, and ample drive torque appropriate for the demands of the driver cannot be transmitted to the road surface.

The present disclosure takes into consideration the above problem, and seeks to provide a vehicle drive device that can thoroughly transmit ample driving torque and braking torque to the road surface appropriate for the demands of the driver even on split-μ roads having different road surface friction on the left and right sides of a vehicle.

SUMMARY

A first aspect of the present disclosure is a vehicle drive device that includes a left electric motor connected to a left wheel of a vehicle, a right electric motor connected to a right wheel of the vehicle, and an electric motor controller that controls a torque of the left electric motor and a torque of the right electric motor. The vehicle drive device also includes a slip acquisition apparatus that acquires a generation of an excess slippage above a predetermined amount of the left wheel and/or the right wheel. When the slip acquisition apparatus acquires the generation of the excess slippage of either the left wheel or the right wheel, the electric motor controller changes the torque of the electric motor connected to the wheel at which the excess slippage occurred by only a first change amount. The electric motor controller also changes the torque of the other electric motor connected to the other wheel by only a second change amount having a sign that is opposite the first change amount.

According to this aspect of the present disclosure, when the left and right wheels are both driven by electric motors and an acceleration slippage is generated at one of either the left or right wheels, the acceleration slippage is reduced by decreasing the power drive torque of the electric motor connected to the wheel at which acceleration slippage has occurred. Further, the power drive torque of the electric motor connected to the left or right side wheel opposing the slipping wheel (the other wheel) is increased, thereby making it possible to supplement the decrease in drive torque of the wheel at which slippage occurred. Accordingly, because ample drive torque appropriate for the driver's demands can be transmitted to the road surface even on split-μ roads, or the like, driving performance can be maintained, and an unnecessary sense of deceleration felt by the passengers is eliminated.

When both the left wheels and the right wheels are braked by electric motors and a deceleration slippage occurs at one of either the left wheels or the right wheels, the deceleration slippage is reduced by decreasing the absolute value of a regenerative driving torque of the electric motor connected to the wheel at which deceleration slippage has occurred. Further, the absolute value of the regenerative driving torque of the electric motor connected to the left or right side wheel opposing the slipping wheel (the other wheel) is increased, thereby making it possible to supplement the decrease in braking torque of the wheel at which slippage occurred.

When the left wheels and the right wheels are driven and braked using respective electric motors and a deceleration slippage occurs at one of either the left wheels or the right wheels, the deceleration slippage is reduced by decreasing the absolute value of the regenerative driving torque of the electric motor connected to the wheel at which deceleration slippage has occurred. Further, the absolute value of the power drive torque of the electric motor connected to the left or right side wheel opposing the slipping wheel (the other wheel) is decreased, thereby enabling tailoring to the decrease in braking torque of the wheel at which slippage occurred. Moreover, the yaw moment generated at the vehicle can also be reduced.

When the left wheels and the right wheels are driven and braked by respective electric motors and an acceleration slippage occurs at one of either the left wheels or the right wheels, the acceleration slippage is reduced by decreasing the absolute value of the power drive torque of the electric motor connected to the wheel at which acceleration slippage has occurred. Further, the absolute value of the regenerative driving torque of the electric motor connected to the left or right side wheel opposing the slipping wheel (the other wheel) is decreased, thereby enabling tailoring to the decrease in drive torque of the wheel at which slippage occurred. Moreover, the yaw moment generated at the vehicle can also be reduced.

In addition to the configuration described above, another aspect of the present disclosure may be such that the electric motor controller generates the first change amount and the second change amount having absolute values that are approximately the same.

According to this aspect of the present disclosure, because the drive torque or braking torque of the left and right wheels does not change before and after the slippage, an excess or deficiency of driving force or braking force can be reliably suppressed.

The disclosure describes in another aspect a vehicle drive device that includes a first motor connected to a first wheel on a first side of a vehicle, a second motor connected to a second wheel on a second side of the vehicle, and a motor controller that controls a torque of the first motor and a torque of the second motor. The vehicle drive device also includes a slip acquisition apparatus that senses a generation of slippage of at least the first wheel. When the slippage at the first wheel is above a predetermined amount, the motor controller decreases an absolute value of the torque of the motor connected to the first wheel. The motor controller also increases an absolute value of the torque of the motor connected to the second wheel.

Moreover, in addition to the configuration described above, another aspect of the present disclosure may be such that the motor controller generates approximately same change amount values for the absolute value of the torque that is decreased and the absolute value of the torque that is increased.

In another aspect, a method for controlling motor traction includes calculating a slippage of a first wheel connected to a first motor and a second wheel connected to a second motor with a slip acquisition apparatus, and determining whether the slippage of the first wheel exceeds a predetermined amount. The method also includes changing a torque by a first amount in the first wheel when the slippage exceeds the predetermined amount in the first wheel, and changing a torque in the second wheel by a second amount having an opposite sign of the first amount.

BRIEF DESCRIPTION OF THE DRAWINGS

FIG. 4 is a table showing an example relationship between a front-wheel drive device and a rear-wheel drive device in various vehicle states in conjunction with the drive state of the electric motor.

DETAILED DESCRIPTION

Figure 1:
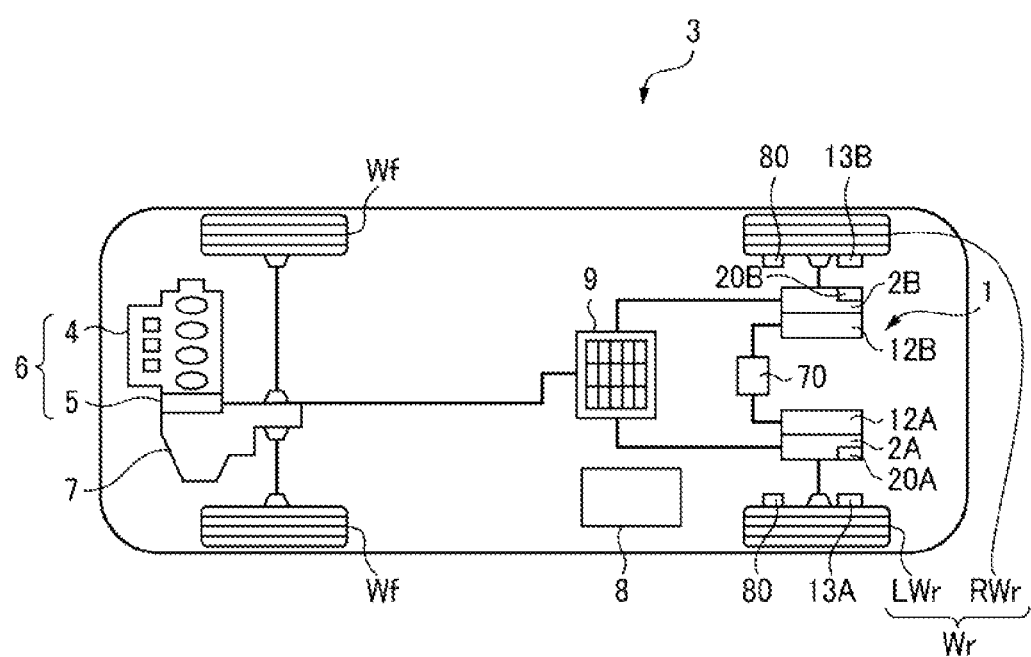
FIG. 1 is a block diagram showing an outline configuration of a hybrid vehicle, according to one embodiment of a vehicle in which an example vehicle drive device can be mounted.
Figure 2:
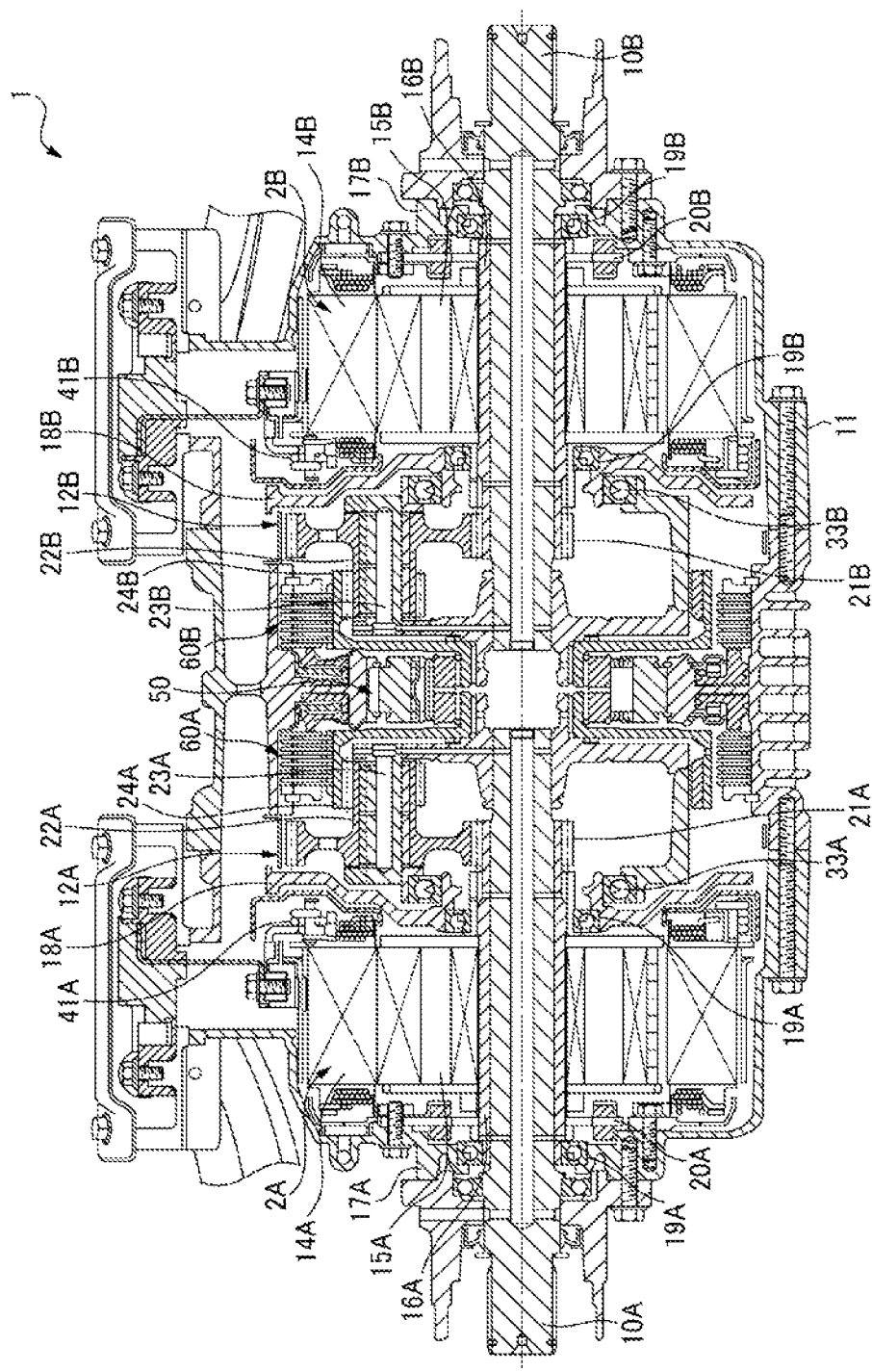
FIG. 2 is a longitudinal cross-sectional view of one embodiment of a rear-wheel drive device.
Figure 3:
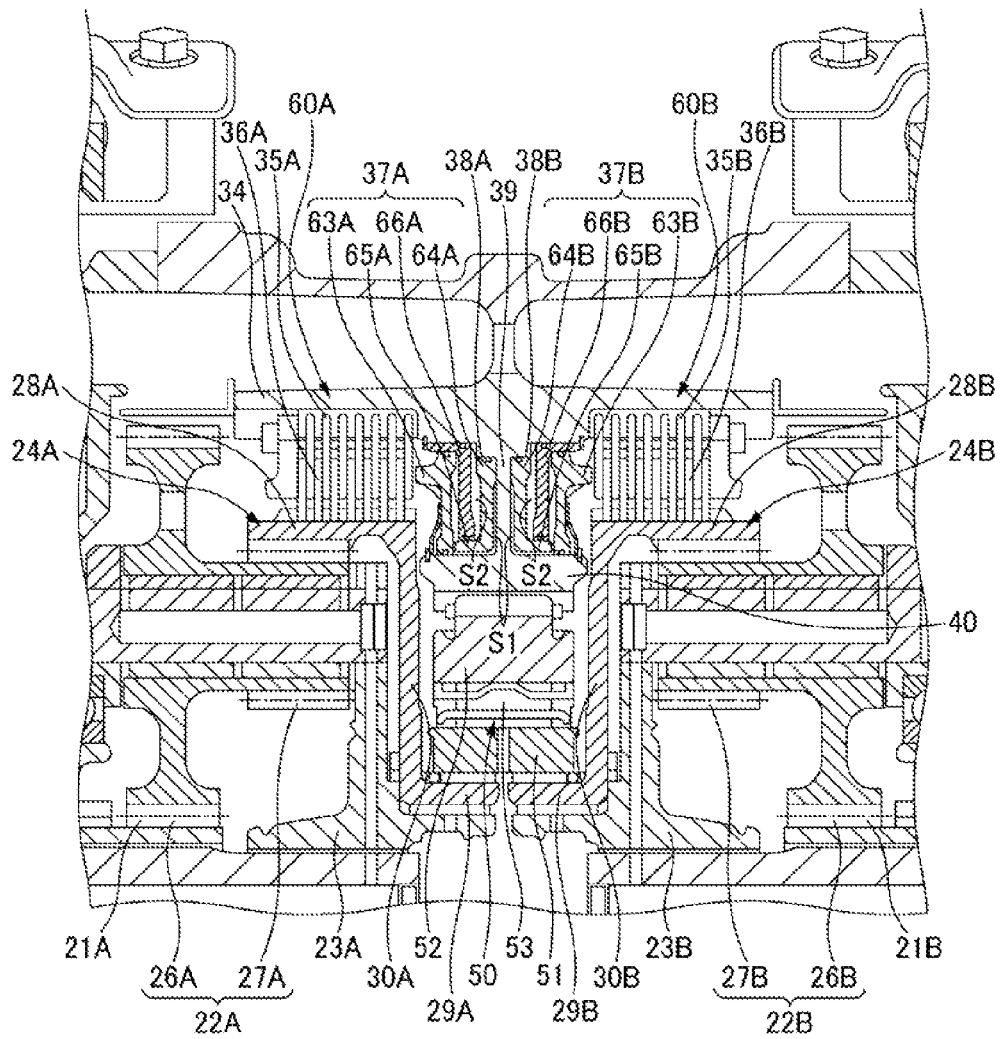
FIG. 3 is a partial enlarged view of the rear-wheel drive device shown in FIG. 2.

One embodiment of a vehicle drive device according to the present disclosure is described based on FIGS. 1 to 3. A vehicle drive device according to the present disclosure, for example, is used in a vehicle having a drive system like that shown in FIG. 1. In the following description, a vehicle drive device is described for a case of application in rear-wheel drive as an example, but the vehicle drive device may also be used for front-wheel drive.

A vehicle 3 shown in FIG. 1 is a hybrid vehicle having a drive device 6 (referred to hereafter as a front-wheel drive device) that includes an internal combustion engine 4 and an electric motor 5 connected in series in a front part of the vehicle. The drive power of this front-wheel drive device 6 is transmitted to front wheels Wf via a transmission 7. On the other hand, the drive power of a drive device 1 (referred to hereafter as a rear-wheel drive device) provided in a rear part of the vehicle and separate from the front-wheel drive device 6 is transmitted to rear wheels Wr (RWr and LWr). The electric motor 5 of the front-wheel drive device 6 and a first electric motor 2A and a second electric motor 2B of the rear-wheel drive device 1 on the rear wheel Wr side are connected to a battery 9, thereby enabling electric power to be supplied from the battery 9 and energy to be regenerated in the battery 9. A controller 8 is used to implement various types of control for the overall vehicle.

FIG. 2 shows an overall longitudinal cross-sectional view of the rear-wheel drive device 1, and in this figure, 10A and 10B are left and right axles of the rear wheel Wr side of the vehicle 3, and are coaxially arranged in the vehicle width direction. A speed reducer case 11 of the rear-wheel drive device 1 is formed in a generally cylindrical shape overall. In an inner part of the speed reducer case 11, the first and second electric motors 2A and 2B for driving the axles, and first and second planetary gear type speed reducers 12A and 12B for reducing the speed of the drive rotation of the first and second electric motors 2A and 2B are arranged coaxially with the axles 10A and 10B. The first electric motor 2A functions as a left electric motor to drive the left rear wheel LWr, and the second electric motor 2B functions as a right electric motor to drive the right rear wheel RWr. The first electric motor 2A and the first planetary gear type speed reducer 12A, and the second electric motor 2B and the second planetary gear type speed reducer 12B are configured within the speed reducer case 11 with left-right symmetry in the vehicle width direction.

As shown in FIG. 1, at the rear wheels Wr, wheel speed sensors 13A and 13B that detect the rotation speed of the left rear wheel LWr and the right rear wheel RWr are provided. Furthermore, a slip acquisition apparatus 80 is provided that can acquire, for example by sensing, the occurrence (generation) of acceleration slippage or deceleration slippage (may be referred to hereafter as simply "slippage") at or above a predetermined amount at the left rear wheel LWr or right rear wheel RWr.

As shown in FIG. 2, respective stators 14A and 14B of the first and second electric motors 2A and 2B are secured in an inner portion of both the left and right ends of the speed reducer case 11, and circular rotors 15A and 15B are configured in a rotatable manner at an inner perimeter of the stators 14A and 14B. Cylindrical shafts 16A and 16B that surround an outer perimeter of the axles 10A and 10B are connected at an inner peripheral portion of the rotors 15A and 15B. The cylindrical shafts 16A and 16B are supported by end walls 17A and 17B and middle walls 18A and 18B of the speed reducer case 11 via bearings 19A and 19B such that the cylindrical shafts 16A and 16B thereof are rotatable relative to the same axis as the axles 10A and 10B. Moreover, at an outer perimeter of one end of the cylindrical shafts 16A and 16B, resolvers 20A and 20B are provided at the ends walls 17A and 17B of the speed reducer case 11 to feed back the rotation speed of the rotors 15A and 15B to a controller (not illustrated) of the first and second electric motors 2A and 2B.

The first and second planetary gear type speed reducers 12A and 12B are equipped with sun gears 21A and 21B, a plurality of planetary gears 22A and 22B that are meshed with these sun gears 21, planetary carriers 23A and 23B that support the planetary gears 22A and 22B, and ring gears 24A and 24B that are meshed with the outer perimeters of the planetary gears 22A and 22B. The driving force of the first and second electric motors 2A and 2B is input from the sun gears 21A and 21B and output to the axles 10A and 10B through the planetary carriers 23A and 23B. The sun gears 21A and 21B are formed in an integrated manner with the cylindrical shafts 16A and 16B.

The planetary gears 22A and 22B, for example as shown in FIG. 3, are twin pinion gears having large diameter first pinions 26A and 26B that are meshed directly with the sun gears 21A and 21B and second pinions 27A and 27B with smaller diameters than the first pinions 26A and 26B. These first pinions 26A and 26B and second pinions 27A and 27B are formed in an integrated manner coaxially and in a state offset in the axial direction. The planetary gears 22A and 22B are supported by the planetary carriers 23A and 23B. The planetary carriers 23A and 23B are spline fitted to the axles 10A and 10B with an interior side end portion in the axial direction extending to an interior side in the radial direction to be supported in an integrated rotatable manner, and are supported by middle walls 18A and 18B via bearings 33A and 33B.

Note that the middle walls 18A and 18B separate an electric motor housing space that houses the first and second electric motors 2A and 2B and a speed reducer space that houses the first and second planetary gear type speed reducers 12A and 12B. The middle walls 18A and 18B are configured to flex such that mutual spacing in the axial direction extends from the outer diameter side to the inner diameter side. Moreover, bearings 33A and 33B that support the planetary carriers 23A and 23B are disposed at the inner diameter side of the middle walls 18A and 18B and at the side of the first and second planetary gear type speed reducers 12A and 12B. Bus rings 41A and 41B for the stators 14A and 14B are disposed on the outer diameter side of the middle walls 18A and 18B and on the side of the first and second electric motors 2A and 2B (see FIG. 2).

As shown in FIG. 3, the ring gears 24A and 24B are equipped and configured with gear parts 28A and 28B having inner peripheral surfaces that are meshed with the small diameter second pinions 27A and 27B, small diameter parts 29A and 29B that are smaller in diameter than the gear parts 28A and 28B and that are arranged mutually opposing at a center position of the speed reducer case 11, and with connections 30A and 30B that connect in a radial direction the interior side end portions in an axial direction of the gear parts 28A and 28B and the exterior side end portions in an axial direction of the small diameter parts 29A and 29B. In the case of this embodiment, a maximum radius of the ring gears 24A and 24B is set such that the radius is smaller than a maximum distance from the center of the axles 10A and 10B of the first pinions 26A and 26B. The small diameter parts 29A and 29B are respectively spline fitted with an inner race 51 of a one-way clutch 50 described below, and the ring gears 24A and 24B are configured such that they rotate in an integral manner with the inner race 51 of the one-way clutch 50.

In more detail, pistons 37A and 37B have first piston walls 63A and 63B and second piston walls 64A and 64B in the front and back in the axial direction. These piston walls 63A, 63B, 64A, and 64B are interlocked by cylindrical inner peripheral walls 65A and 65B. Accordingly, a circular space that opens on the outer side in the radial direction is formed between the first piston walls 63A and 63B and the second piston walls 64A and 64B, and this circular space is partitioned to the left and right in the axial direction by partitioning members 66A and 66B that are secured to the inner peripheral surface of the exterior walls of cylinder chambers 38A and 38B. A space between a right/left dividing wall 39 of the speed reducer case 11 and the second piston walls 64A and 64B forms a first operation chamber S1 in which high pressure oil is directly introduced. A space between the partitioning members 66A and 66B and the first piston walls 63A and 63B forms a second operation chamber S2 that is conductively connected with the first operation chamber S1 by way of through holes formed in the inner peripheral walls 65A and 65B. The space between the second piston walls 64A and 64B and the partitioning members 66A and 66B is conducted to atmospheric pressure.

At hydraulic brakes 60A and 60B, oil from an electric oil pump 70 (see FIG. 1) is introduced into the first operation chamber S1 and the second operation chamber S2 from a hydraulic circuit (not illustrated). Stationary plates 35A and 35B and rotating plates 36A and 36B can be reciprocally pushed by the oil pressure acting on the first piston walls 63A and 63B and the second piston walls 64A and 64B. Accordingly, because a large pressure receiving surface area can be put to use by the first and second piston walls 63A, 63B, 64A, and 64B on the left and right sides in the axial direction, a large pressing force with respect to the stationary plates 35A and 35B and the rotating plates 36A and 36B can be obtained while keeping the surface area in the radial direction of the pistons 37A and 37B suppressed.

In the case of these hydraulic brakes 60A and 60B, the stationary plates 35A and 35B are supported by an outer diameter side support part 34 that extends from the speed reducer case 11, and the rotating plates 36A and 36B are supported by the ring gears 24A and 24B. When both the stationary and rotating plates 35A, 35B, 36A and 36B are pressed by the pistons 37A and 37B, a braking force acts on the ring gears 24A and 24B by friction fastening between the plates 35A, 35B, 36A, and 36B, thereby causing fixation (locking) to occur. When fastening by the pistons 37A and 37B is released from that state, free rotation of the ring gears 24A and 24B is allowed. Namely, the hydraulic brakes 60A and 60B lock the ring gears 24A and 24B when fastened, thereby forming a connected state in which drive power can be transmitted along a drive power transmission pathway between the first and second electric motors 2A and 2B and the rear wheels Wr. When the hydraulic brakes 60A and 60B are released, rotation of the ring gears 24A and 24B is allowed, and an interrupted state is formed in which drive power cannot be transmitted along the drive power transmission pathway.

The one-way clutch 50 is disposed in a space portion that is maintained between the connections 30A and 30B of the ring gears 24A and 24B facing the axial direction. The one-way clutch 50 transmits only unidirectional drive power to the ring gears 24A and 24B and blocks drive power in the other direction. The one-way clutch 50 has a plurality of sprags 53 interposed between the inner race 51 and an outer race 52, and is configured such that the inner race 51 thereof is spline fitted to achieve rotation in an integrated manner with the small diameter parts 29A and 29B of the ring gears 24A and 24B. In other words, the ring gear 24A and the ring gear 24B are mutually interlocked in an integrated rotatable manner by the inner race 51. Moreover, the outer race 52 is positioned by an inner diameter side support part 40 and is stopped from rotating. The one-way clutch 50 is configured such that when the vehicle 3 is advancing by drive power from the first and second electric motors 2A and 2B, the clutch engages, and rotation of the ring gears 24A and 24B is locked.

As a more concrete explanation, when torque of the forward direction (direction of rotation when the vehicle 3 is moving forward) of the first and second electric motors 2A and 2B is input into the rear wheel Wr side, the one-way clutch 50 engages, thereby creating a state that enables transmission of drive power. When reverse direction torque of the first and second electric motors 2A and 2B is input into the rear wheel Wr side, the one-way clutch 50 is not engaged, thereby creating a state in which drive power cannot be transmitted. Furthermore, when the forward direction torque of the rear wheel Wr side is input into the first and second electric motors 2A and 2B sides, the one-way clutch 50 is not engaged, thereby creating a state in which drive power cannot be transmitted. When the reverse direction torque of the rear wheel Wr side is input into the first and second electric motors 2A and 2B side, the one-way clutch 50 is engaged, thereby creating a state that enables the transmission of drive power. In other words, when the one-way clutch 50 is not engaged, unidirectional rotation of the ring gears 24A and 24B due to the reverse direction torque of the first and second electric motors 2A and 2B is allowed, and when the one-way clutch 50 is engaged, reverse direction rotation of the ring gears 24A and 24B due to the forward direction torque of the first and second electric motors 2A and 2B is restricted. Note that reverse direction torque indicates directional torque that causes rotation in the reverse direction to increase or directional torque that causes rotation in the forward direction to decrease.

In this way, in a rear-wheel drive device 1 of the present embodiment, the one-way clutch 50 and the hydraulic brakes 60A and 60B are provided in parallel in the drive power transmission pathway with the first and second electric motors 2A and 2B and the rear wheels Wr. Note that it is not necessary to provide two of the hydraulic brakes 60A and 60B. For example, a hydraulic brake may be provided on only one side, and the space on the other side may be used as a breather chamber.

Here, the controller 8 (see FIG. 1) is a controller for implementing various types of control for the overall vehicle. The rotation speed of the left and right rear wheels LWr and RWr acquired from the wheel speed sensors 13A and 13B, the rotation speed of the first and second electric motors 2A and 2B acquired from the resolvers 20A and 20B, the steering angle, the accelerator pedal (AP) opening degree, the shift position, the state of charge (SOC) of the battery 9, the oil temperature, and the like, are input into the controller 8. Signals that control the internal combustion engine 4, signals that control the first and second electric motors 2A and 2B, and the like, are output from the controller 8.

FIG. 4 describes the relationship between the front-wheel drive device 6 and the rear wheel drive-device 1 in each vehicle state in conjunction with an operating state of the first and second electric motors 2A and 2B. In this figure, the front unit represents the front-wheel drive device 6, the rear unit represents the rear-wheel drive device 1, the rear motor represents the first and second electric motors 2A and 2B, OWC represents the one-way clutch 50, and BRK represents the hydraulic brakes 60A and 60B. Moreover, FIGS. 5 to 10 show velocity collinear charts for each state of the rear-wheel drive device 1. LMOT represents the first electric motor 2A, and RMOT represents the second electric motor 2B. S and C on the left sides respectively represent the sun gear 21A of the first planetary gear type speed reducer 12A linked to the first electric motor 2A and the planetary gear 22A, and the planetary carrier 23A linked to the axle 10A. S and C on the right sides respectively represent the sun gear 21B of the second planetary gear type speed reducer 12B linked to the second electric motor 2B and the planetary gear 22B, and planetary carrier 23B linked to the axle 10B. R represents the ring gears 24A and 24B, BRK represents the hydraulic brakes 60A and 60B, and OWC represents the one-way clutch 50. In the description below, the direction of rotation of the sun gears 21A and 21B when the vehicle is moving forward due to the first and second electric motors 2A and 2B is a forward direction. Moreover, in the figures, the upper side from the state of the vehicle being stopped is rotation in the forward direction and the lower side is rotation in the reverse direction. In addition, the arrows pointing upward represent torque in the forward direction, and the downward pointing arrows represent torque in the reverse direction.

Figure 5:
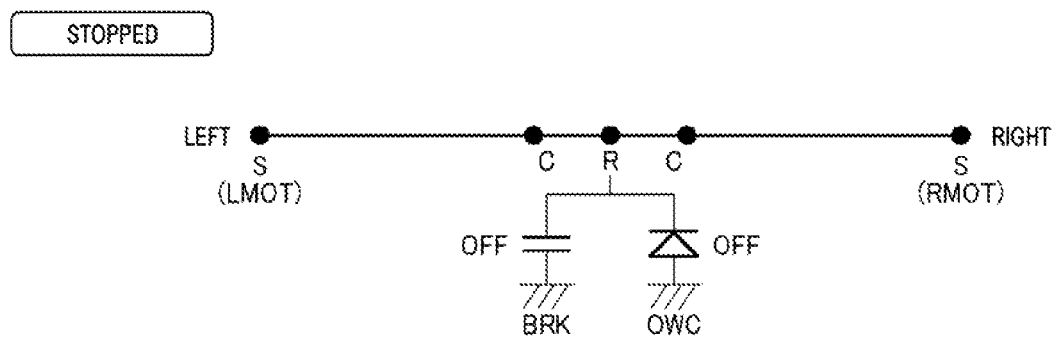
FIG. 5 is a velocity collinear chart of a rear-wheel drive device when a vehicle is stopped.

While the vehicle is stopped, neither the front-wheel drive device 6 nor the rear-wheel drive device 1 is activated. Accordingly, as shown in FIG. 5, because the first and second electric motors 2A and 2B of the rear-wheel drive device 1 are stopped, and the axles 10A and 10B are also stopped, torque does not act on any of the elements. At this time, the hydraulic brakes 60A and 60B are released (OFF). Moreover, the one-way clutch 50 is not engaged (OFF) because the first and second electric motors 2A and 2B are not activated.

Figure 6:
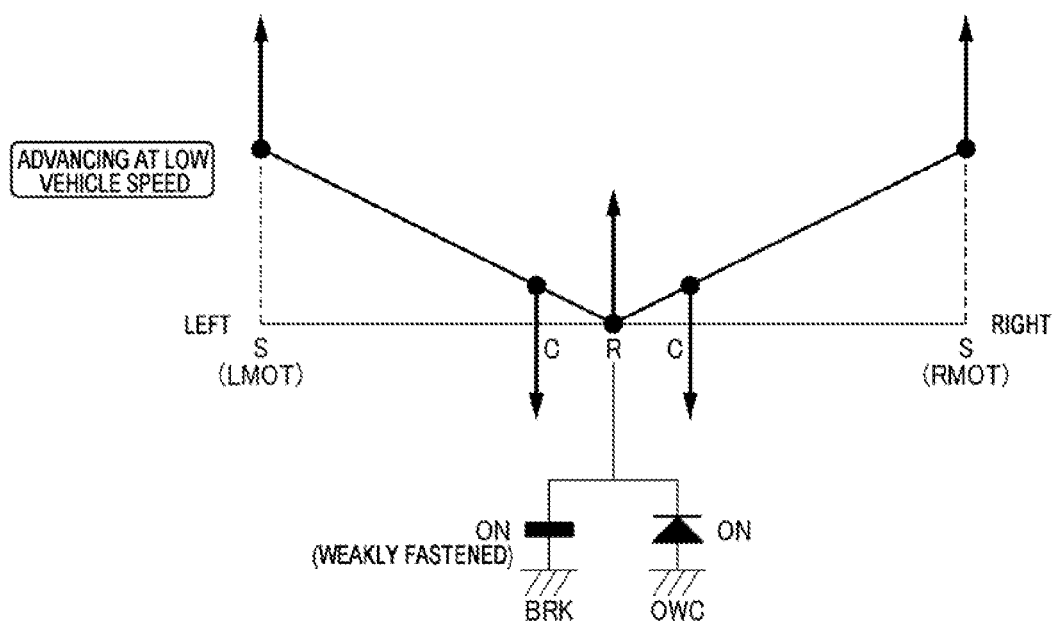
FIG. 6 is a velocity collinear chart of a rear-wheel drive device when a vehicle is advancing at a low vehicle speed.

After the key position is switched to ON, rear-wheel drive is activated by the rear-wheel drive device 1 when the vehicle advances at a low vehicle speed with good motor efficiency such as in electric vehicle (EV) departure, EV cruise, and the like. As shown in FIG. 6, when power drive is implemented such that the first and second electric motors 2A and 2B rotate in the forward direction, forward direction torque is added to the sun gears 21A and 21B. At this time, as described above, the one-way clutch 50 engages, and the ring gears 24A and 24B are locked. Through this, the planetary carriers 23A and 23B rotate in the forward direction, and forward running is performed. Note that running resistance from the axles 10A and 10B acts in the reverse direction on the planetary carriers 23A and 23B. When the vehicle 3 takes off in this way, the key position is switched to ON, the one-way clutch 50 mechanically engages by increasing the torque of the first and second electric motors 2A and 2B, and the ring gears 24A and 24B are locked.

At this time, the hydraulic brakes 60A and 60B are controlled in a weakly fastened state. Note that weakly fastened refers to a state that allows the transmission of drive power, but that is a state in which the hydraulic brakes 60A and 60B are fastened with a weak fastening force with respect to the fastening force of a fastened state of the hydraulic brakes 60A and 60B. When forward direction torque of the first and second electric motors 2A and 2B is input in the rear wheel Wr side, the one-way clutch 50 enters an engaged state, and transmission of drive power with only the one-way clutch 50 becomes possible. However, input of the forward direction torque from the first and second electric motors 2A and 2B is temporarily decreased by both creating a weakly fastened state for the hydraulic brakes 60A and 60B that are provided in parallel with the one-way clutch 50 and by creating a connected state between the side of the first and second electric motors 2A and 2B and the rear wheel Wr side. Even if the one-way clutch 50 becomes disengaged, a state of being unable to transmit drive power at the side of the first and second electric motors 2A and 2B and at the rear wheel Wr side can be suppressed. Moreover, when a transition is made to the deceleration regeneration described below, rotation speed control to create a state of connection between the side of the first and second electric motors 2A and 2B and the rear wheel Wr side becomes unnecessary. The energy consumed to fasten the hydraulic brakes 60A and 60B is reduced by making the fastening force of the hydraulic brakes 60A and 60B when the one-way clutch 50 is engaged weaker than the fastening force of the hydraulic brakes 60A and 60B when the one-way clutch 50 is disengaged.

Figure 7:
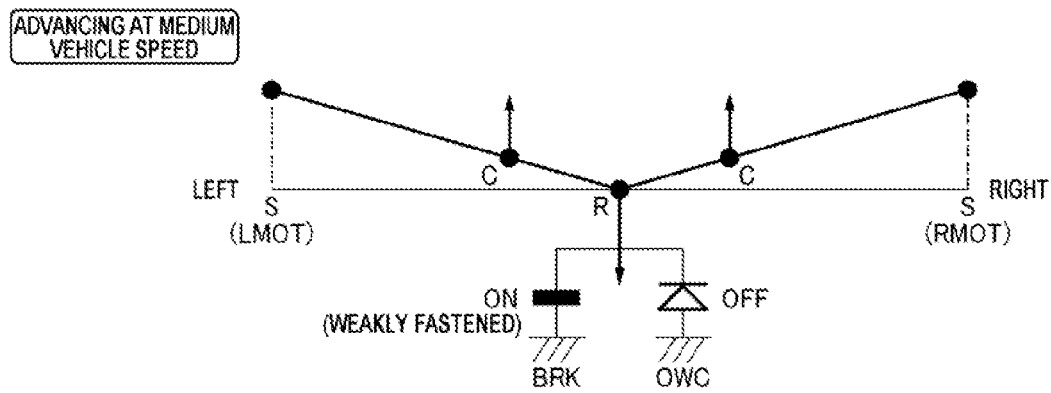
FIG. 7 is a velocity collinear chart of a rear-wheel drive device when a vehicle is advancing at a medium vehicle speed.

When the vehicle speed increases from a low vehicle speed and reaches a speed at which the vehicle advances at a medium vehicle speed with good engine efficiency, a switch is made from rear-wheel drive by the rear-wheel drive device 1 to front-wheel drive by the front-wheel drive device 6. As shown in FIG. 7, when power drive of the first and second electric motors 2A and 2B stops, forward direction torque that attempts to promote running in the forward direction from the axles 10A and 10B acts on the planetary carriers 23A and 23B, and therefore, as described above, the one-way clutch 50 becomes disengaged. At this time as well, the hydraulic brakes 60A and 60B are controlled in a weakly fastened state.

Figure 8:
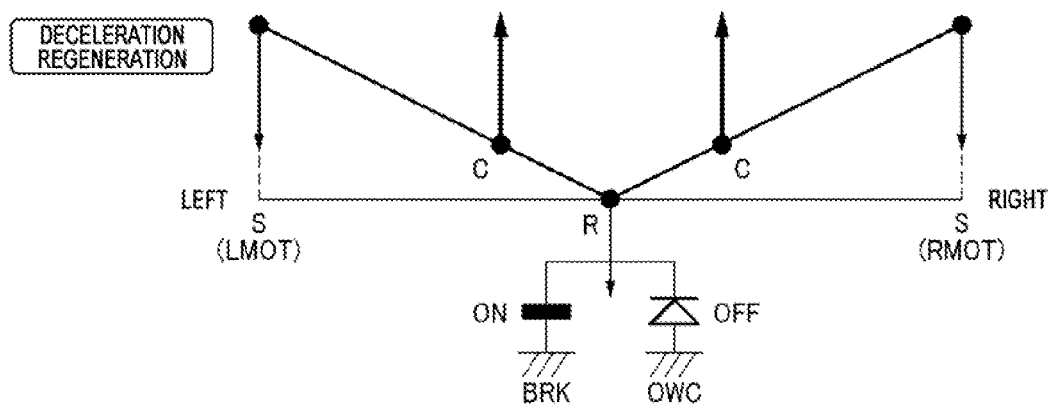
FIG. 8 is a velocity collinear chart of a rear-wheel drive device when a vehicle is in deceleration regeneration.

From the state of FIG. 6 or FIG. 7, when regenerative driving of the first and second electric motors 2A and 2B is attempted, as shown in FIG. 8, forward direction torque that attempts to continue running in the forward direction from the axles 10A and 10B acts on the planetary carriers 23A and 23B, and therefore, as described above, the one-way clutch 50 becomes disengaged. At this time, the hydraulic brakes 60A and 60B are controlled in a fastened state (ON). Accordingly, the ring gears 24A and 24B are fixed, a reverse direction regenerative braking torque acts on the first and second electric motors 2A and 2B, and deceleration regeneration is performed by the first and second electric motors 2A and 2B. In this manner, when forward direction torque of the rear wheel Wr side is input into the side of the first and second electric motors 2A and 2B, the one-way clutch 50 becomes disengaged, and the transmission of drive power by only the one-way clutch 50 becomes impossible. However, by fastening the hydraulic brakes 60A and 60B that are provided in parallel with the one-way clutch 50, and creating a connected state between the side of the first and second electric motors 2A and 2B and the rear wheel Wr side, a state that enables the transmission of drive power can be maintained, and in this state, the energy of the vehicle 3 can be regenerated by controlling the first and second electric motors 2A and 2B in a regenerative driving state.

Next, when acceleration occurs, all-wheel drive by the front-wheel drive device 6 and the rear-wheel drive device 1 is implemented. The rear-wheel drive device 1 enters the same state as when the vehicle advances at a low vehicle speed as shown in FIG. 6.

Figure 9:
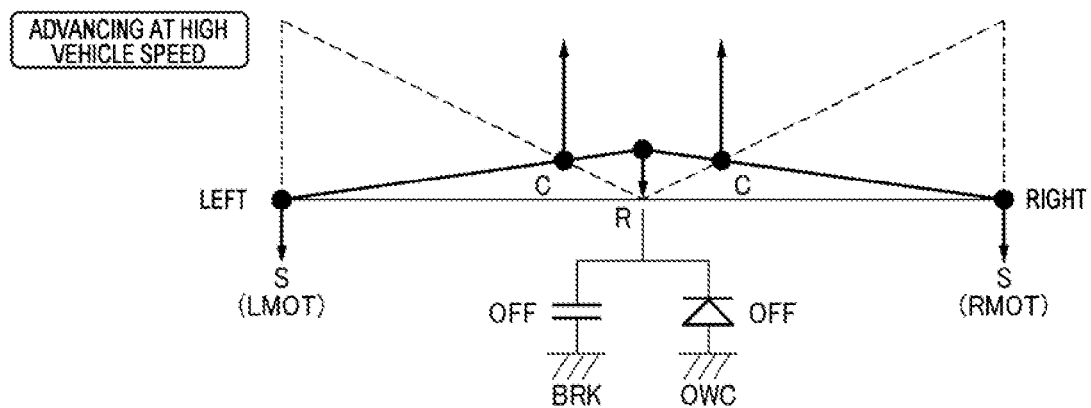
FIG. 9 is a velocity collinear chart of a rear-wheel drive device when a vehicle is advancing at a high vehicle speed.

When the vehicle advances at a high vehicle speed, front-wheel drive is implemented by the front-wheel drive device 6, but typically, the first and second electric motors 2A and 2B are stopped. As shown in FIG. 9, when the first and second electric motors 2A and 2B stop power drive, forward direction torque that attempts to promote running in the forward direction from the axles 10A and 10B acts on the planetary carriers 23A and 23B, and therefore, as described above, the one-way clutch 50 becomes disengaged. At this time, rotation loss of the sun gears 21A and 21B and of the first and second electric motors 2A and 2B is input as resistance into the sun gears 21A and 21B, and rotation loss of the ring gears 24A and 24B is generated at the ring gears 24A and 24B.

At this time, the hydraulic brakes 60A and 60B are controlled in a released state (OFF). Accordingly, drag turning of the first and second electric motors 2A and 2B is prevented, and the occurrence of over-rotation of the first and second electric motors 2A and 2B during high vehicle speeds by the front-wheel drive device 6 is prevented.

Figure 10:
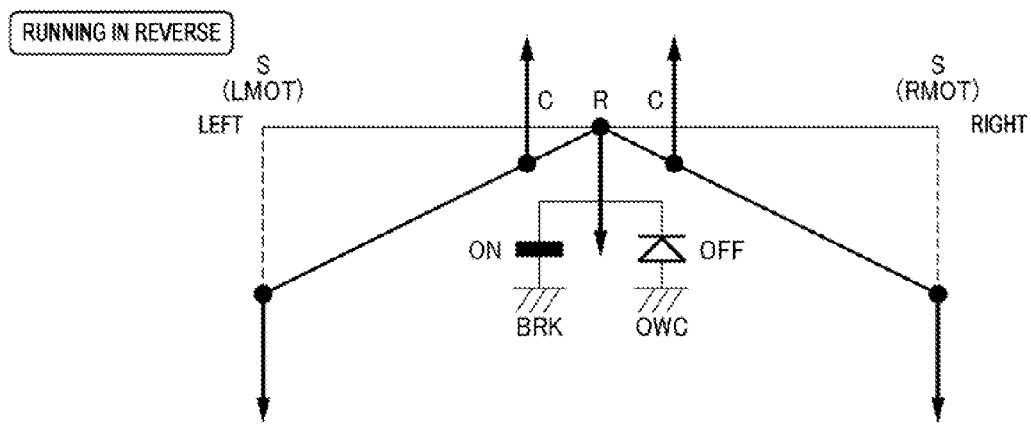
FIG. 10 is a velocity collinear chart of a rear-wheel drive device when a vehicle is running in reverse.

As shown in FIG. 10, when the first and second electric motors 2A and 2B are reverse power driven while a vehicle is running in reverse, a reverse direction torque is added to the sun gears 21A and 21B. At this time, as described above, the one-way clutch 50 becomes disengaged.

At this time, the hydraulic brakes 60A and 60B are controlled in a fastened state. Accordingly, the ring gears 24A and 24B are fixed, the planetary carriers 23A and 23B rotate in a reverse direction, and running in the reverse direction is performed. Note that running resistance from the axles 10A and 10B acts in the forward direction on the planetary carriers 23A and 23B. In this manner, when reverse direction torque of the side of the first and second electric motors 2A and 2B is input into the rear wheel Wr side, the one-way clutch 50 becomes disengaged, and the transmission of drive power by only the one-way clutch 50 is impossible. However, by fastening the hydraulic brakes 60A and 60B that are provided in parallel with the one-way clutch 50, and creating a connected state between the side of the first and second electric motors 2A and 2B and the rear wheel Wr side, a state that enables the transmission of drive power can be maintained, and the vehicle 3 can be caused to run in reverse by the torque of the first and second electric motors 2A and 2B.

In this manner, with the rear-wheel drive device 1, fastening and release of the hydraulic brakes 60A and 60B are controlled in accordance with the running state of the vehicle. In other words, the hydraulic brakes 60A and 60B are fastened, and the fastening force is also adjusted, in accordance with whether the direction of rotation of the first and second electric motors 2A and 2B is a forward direction or a reverse direction, and whether or not drive power is input from either the side of the first and second electric motors 2A and 2B or the rear wheel Wr side.

Figure 11:
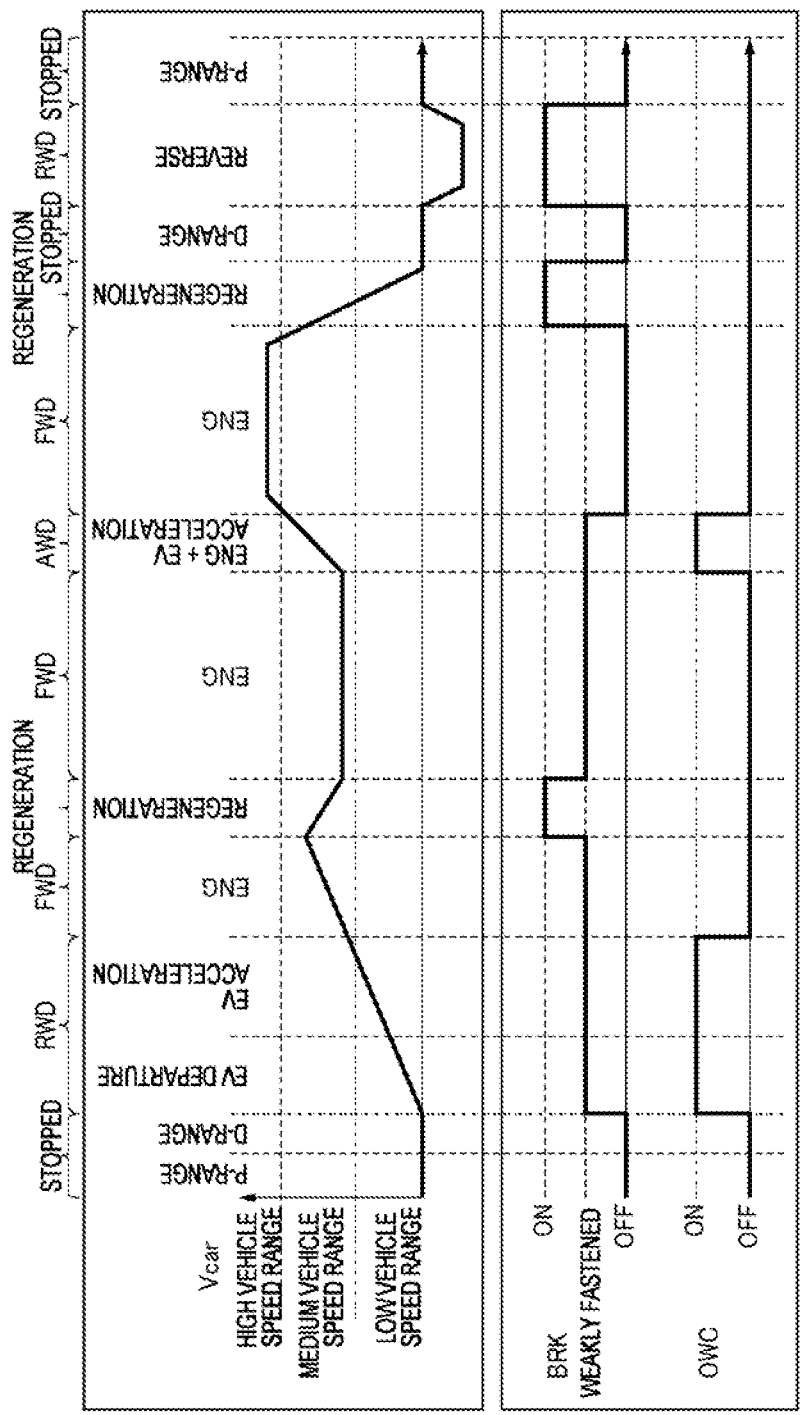
FIG. 11 is a timing chart for a vehicle when running in different vehicle states.

FIG. 11 is a timing chart of the one-way clutch 50 (OWC) and hydraulic brakes 60A and 60B (BRK) from a state of a vehicle being stopped to EV departure→EV acceleration→ENG acceleration→deceleration regeneration→medium speed ENG cruise→ENG+EV acceleration→high speed ENG cruise→deceleration regeneration→vehicle stopped→reverse→and the vehicle being stopped.

First, the state of the one-way clutch 50 being disengaged (OFF) and the hydraulic brakes 60A and 60B being released (OFF) is maintained until the key position is switched to ON, the shifter is shifted from the P-range to the D-range, and the accelerator pedal is pressed. From there, when the accelerator pedal is pressed, EV departure and EV acceleration are performed by the rear-wheel drive device 1 in rear-wheel drive (RWD). At this time, the one-way clutch 50 engages (ON), and the hydraulic brakes 60A and 60B enter a weakly fastened state. As the vehicle speed increases from a low vehicle speed range to a medium vehicle speed range and the vehicle switches from rear-wheel drive to front-wheel drive, ENG running (FWD) by the internal combustion engine 4 is performed. At this time, the one-way clutch 50 disengages (OFF), and the state (weakly fastened state) of the hydraulic brakes 60A and 60B is maintained as is. When deceleration regeneration occurs, such as when the brake pedal is pressed, the hydraulic brakes 60A and 60B are fastened (ON) with the one-way clutch 50 in a disengaged (OFF) state. During medium speed cruising by the internal combustion engine 4, a state that is the same as the ENG running state described above occurs. Next, when the accelerator pedal is pressed further and a transition is made from front-wheel drive to all-wheel drive (AWD), the one-way clutch 50 once again engages (ON). When the vehicle speed increases from the medium speed range to the high speed range, ENG running (FWD) by the internal combustion engine 4 is once again performed. At this time, the one-way clutch 50 disengages (OFF), the hydraulic brakes 60A and 60B are released (OFF), and the first and second electric motors 2A and 2B are stopped. When deceleration regeneration occurs, a state that is the same as the state during the deceleration regeneration described above occurs. When the vehicle stops, the one-way clutch 50 disengages (OFF), and the hydraulic brakes 60A and 60B enter a released (OFF) state.

Next, when the vehicle is running in reverse, the hydraulic brakes 60A and 60B are fastened (ON) with the one-way clutch 50 in a disengaged (OFF) state. When the vehicle stops, the one-way clutch 50 disengages (OFF), and the hydraulic brakes 60A and 60B enter a released (OFF) state.

<Control of Motor Traction Control>

In this manner, the controller 8 controls the front-wheel drive device 6 and the rear-wheel drive device 1 according to each vehicle state. However, relative to the rear-wheel drive device 1 in particular, the controller 8 functions as an electric motor controller having a motor traction control system (M-TCS or TCS) that controls motor traction control based on the rotation speed of the rear wheels Wr or on the rotation speed of the first and second electric motors 2A and 2B. At that time, the torque generated by the first and second electric motors 2A and 2B is controlled, and the rotational state of the rear wheel LWr and Rwr is controlled.

(Control of Motor Traction Control During Power Running)

Figure 12:
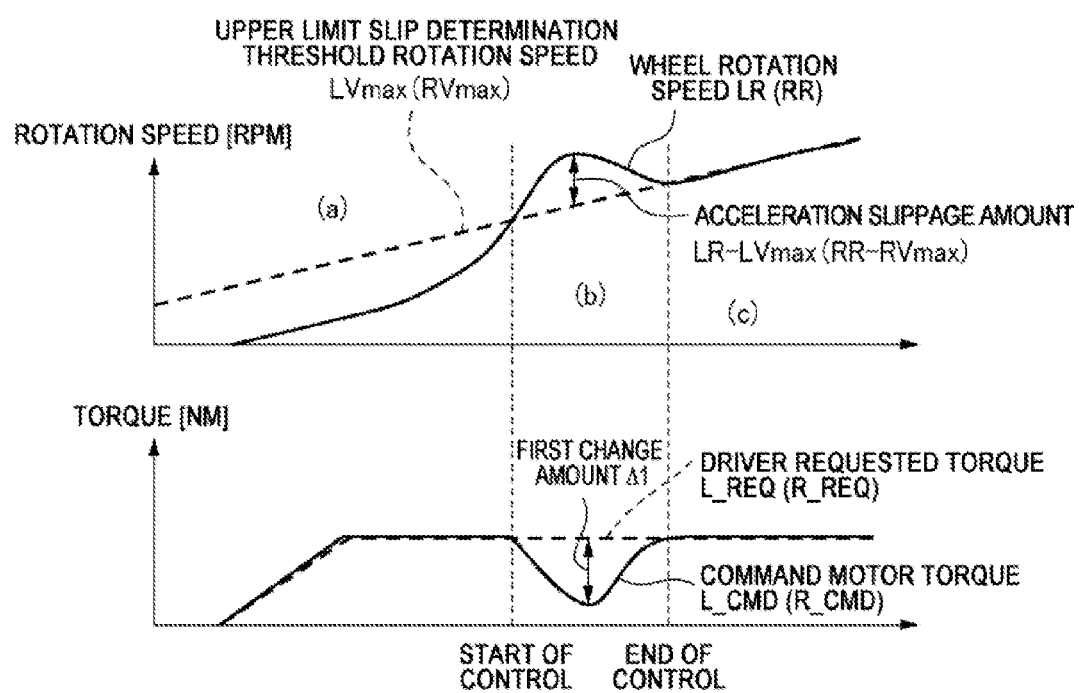
FIG. 12 is an illustration showing the rotation speed of the wheels and the motor torque during control by motor traction control.

For example, as shown in FIG. 12, in motor traction control for a case in which the rear wheels LWr and Rwr are driven by the power driven first and second electric motors 2A and 2B, the slip acquisition apparatus 80 compares the left and right wheel rotation speeds LR and RR acquired by the wheel speed sensors 13A and 13B with the upper limit slip determination threshold rotation speeds LVmax and RVmax of the left and right wheels LWr and RWr determined based on the target rotation speed of the wheels (not illustrated). As shown by (a), when both the left and right wheel rotation speeds LR and RR are equal to or less than the upper limit slip determination threshold rotation speeds LVmax and RVmax, (LR≤LVmax, and RR≤RVmax), the determination is made that acceleration slippage is not being generated at the rear wheels LWr and RWr. The controller 8 outputs command motor torque values (power drive torque values) L_CMD and R_CMD to the first and second electric motors 2A and 2B such that the driver requested torque values L_REQ and R_REQ are satisfied (L_CMD=L_REQ, R_CMD=R_REQ). Here, the driver requested torque values L_REQ and R_REQ are approximately the same positive values (L_REQ=R_REQ>0).

As shown by (b), when the slip acquisition apparatus 80 acquires information that indicates that either of the wheel rotation speeds LR or RR has exceeded the upper limit slip determination threshold rotation speed LVmax or RVmax (LR>LVmax, or RR>RVmax), the determination is made that acceleration slippage (excess slippage) at or above a predetermined level has been generated at a rear wheel Wr (LWr, RWr). At this time, the controller 8 changes the command motor torque values L_CMD and R_CMD of the first electric motor 2A and/or the second electric motor 2B connected to the left rear wheel LWr and/or the right rear wheel RWr where acceleration slippage has occurred by only a first change amount Δ1. This first change amount Δ1 is determined based on acceleration slippage amounts LR-LVmax and RR-RVmax, which are the differences between the upper limit slip determination threshold rotation speeds LVmax and RVmax and the wheel rotation speeds LR and RR (L_CMD=L_REQ+Δ1, R_CMD=R_REQ+Δ1). Here, the first change amount Δ1 is set to a negative number (Δ1<0), and the command motor torque values L_CMD and R_CMD are decreased by only the amount of the absolute value of the first change amount Δ1. In other words, the absolute values of the command motor torque values L_CMD and R_CMD are decreased by only the amount of the absolute value of the first change amount Δ1.

As shown by (c) in FIG. 12, when the slip acquisition apparatus 80 acquires information once again that the wheel rotation speeds LR and RR are equal to or less than the upper limit slip determination threshold rotation speeds LVmax and RVmax (LR≤LVmax and RR≤RVmax), a determination is made that acceleration slippage of the rear wheels LWr and RWr has ended. The controller 8 outputs command motor torque values L_CMD and R_CMD to the first and second electric motors 2A and 2B such that the driver requested torque values L_REQ and R_REQ are satisfied (L_CMD=L_REQ, R_CMD=R_REQ).

Figure 13:
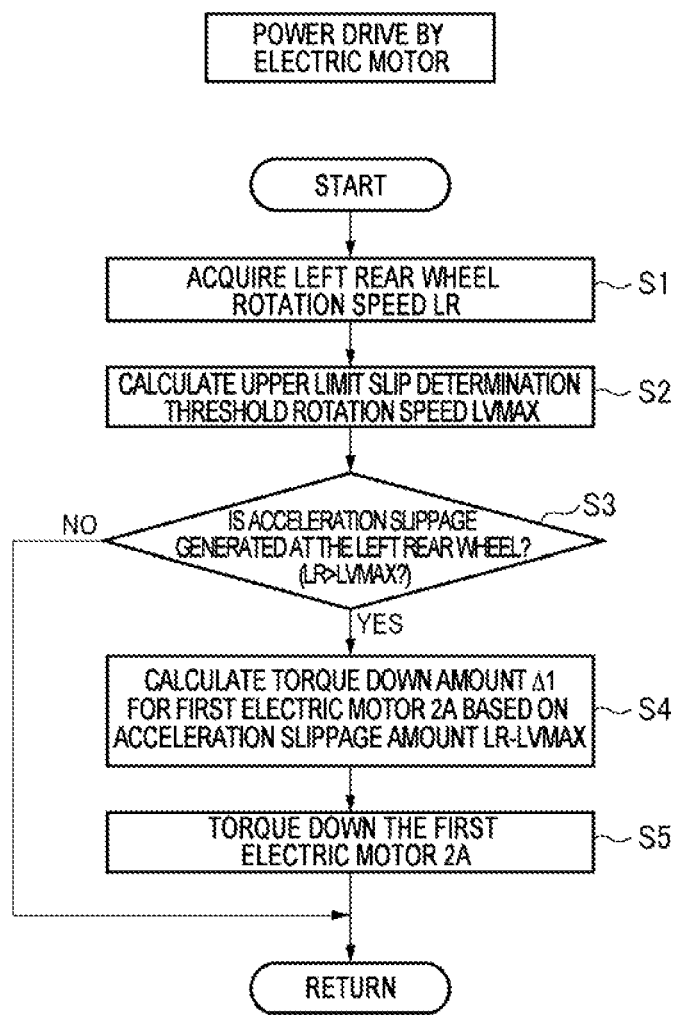
FIG. 13 is an illustration showing a control flow chart for control by motor traction control when an electric motor is exerting driving force.

Now, the flow of control of motor traction control is described while referencing FIG. 13 using a case in which the left rear wheel LWr is driven by the power driven first electric motor 2A as an example. First, the left rear wheel rotation speed LR is acquired by the wheel speed sensor 13A (S1), and next, the upper limit slip determination threshold rotation speed LVmax is calculated based on the target rotation speed for the wheel (not illustrated) (S2). The slip acquisition apparatus 80 compares the left rear wheel rotation speed LR and the upper limit slip determination threshold rotation speed LVmax, and determines if acceleration slippage is or is not being generated at the left rear wheel LWr (S3). As a result, if the left rear wheel rotation speed LR is at or below the upper limit slip determination threshold rotation speed LVmax (LR≤LVmax), a determination is made that acceleration slippage is not being generated, or that the acceleration slippage is within a range that can be tolerated, and the processing is completed. On the other hand, if the left rear wheel rotation speed LR is larger than the upper limit slip determination threshold rotation speed LVmax (LR>LVmax), a determination is made that acceleration slippage that is at or above a predetermined level that cannot be tolerated has been generated. Then, a command motor torque amount (first change amount Δ1) that should cause a decrease is calculated for the first electric motor 2A connected to the left rear wheel LWr based on the acceleration slippage amount LR-LVmax (S4). The command motor torque L_CMD of the first electric motor 2A is changed by only the above-mentioned first change amount Δ1 (<0), or in other words, the absolute value of the command motor torque L_CMD of the first electric motor 2A is decreased by only the amount of the absolute value of the first change amount Δ1 (S5). In this manner, an acceleration slippage state of the left rear wheel LWr is quickly resolved, energy consumption is suppressed, and an unstable state of the vehicle 3 can be resolved.

(Control of Motor Traction Control During Regeneration)

Thus far, control of motor traction control for a case in which the rear wheels LWr and RWr are driven by the power driven first and second electric motors 2A and 2B was described. However, control of motor traction control is also possible for a case in which braking of the rear wheels LWr and RWr is done by first and second electric motors 2A and 2B that are regeneratively driven. Note that control of motor traction control for a case in which the first and second electric motors 2A and 2B are regeneratively driven is substantially the same as control of motor traction control for the above-mentioned case in which the first and second electric motors 2A and 2B are power driven (see FIG. 12), and therefore, an illustration for this case is omitted.

In the control of motor traction control for a case in which the first and second electric motors 2A and 2B are both regeneratively driven, the slip acquisition apparatus 80 compares the left and right wheel rotation speeds LR and RR and the lower limit slip determination threshold rotation speeds LVmin and RVmin of the left and right wheels LWr and RWr determined based on the target rotation speed of the wheels. When both the left and right wheel rotation speeds LR and RR are equal to or greater than the lower limit slip determination threshold rotation speeds LVmin and RVmin (LR≥LVmin, and RR≥RVmin), a determination is made that deceleration slippage is not being generated at the rear wheels LWr and RWr. The controller 8 outputs command motor torque values (regenerative driving torque values) L_CMD and R_CMD to the first and second electric motors 2A and 2B such that the driver requested torque values L_REQ and R_REQ are satisfied (L_CMD=L_REQ, R_CMD=R_REQ). Here, the driver requested torque values L_REQ and R_REQ are approximately the same negative values (L_REQ=R_REQ<0).

On the other hand, when information is acquired that indicates that the wheel rotation speed LR or RR has fallen below the lower limit slip determination threshold rotation speed LVmin or RVmin (LR<LVmin, or RR<RVmin), a determination is made that deceleration slippage at or above a predetermined level has been generated at a rear wheel Wr (LWr, RWr). At this time, the controller 8 changes the command motor torque values L_CMD and R_CMD of the first electric motor 2A and/or the second electric motor 2B connected to the left rear wheel LWr and/or the right rear wheel RWr where deceleration slippage has occurred by only a first change amount Δ1'. This first change amount Δ1' is determined based on the amount of deceleration slippage, which is the difference between the lower limit slip determination threshold rotation speeds LVmin and RVmin and the wheel rotation speeds LR and RR (L_CMD=L_REQ+Δ1', R_CMD=R_REQ+Δ1'). Here, the first change amount Δ1' is set to a positive number (Δ1'>0), and the command motor torque values L_CMD and R_CMD are increased by only the amount of the absolute value of the first change amount Δ1'. In other words, the absolute values of the command motor torque values L_CMD and R_CMD are decreased by only the amount of the absolute value of the first change amount Δ1'.

Figure 14:
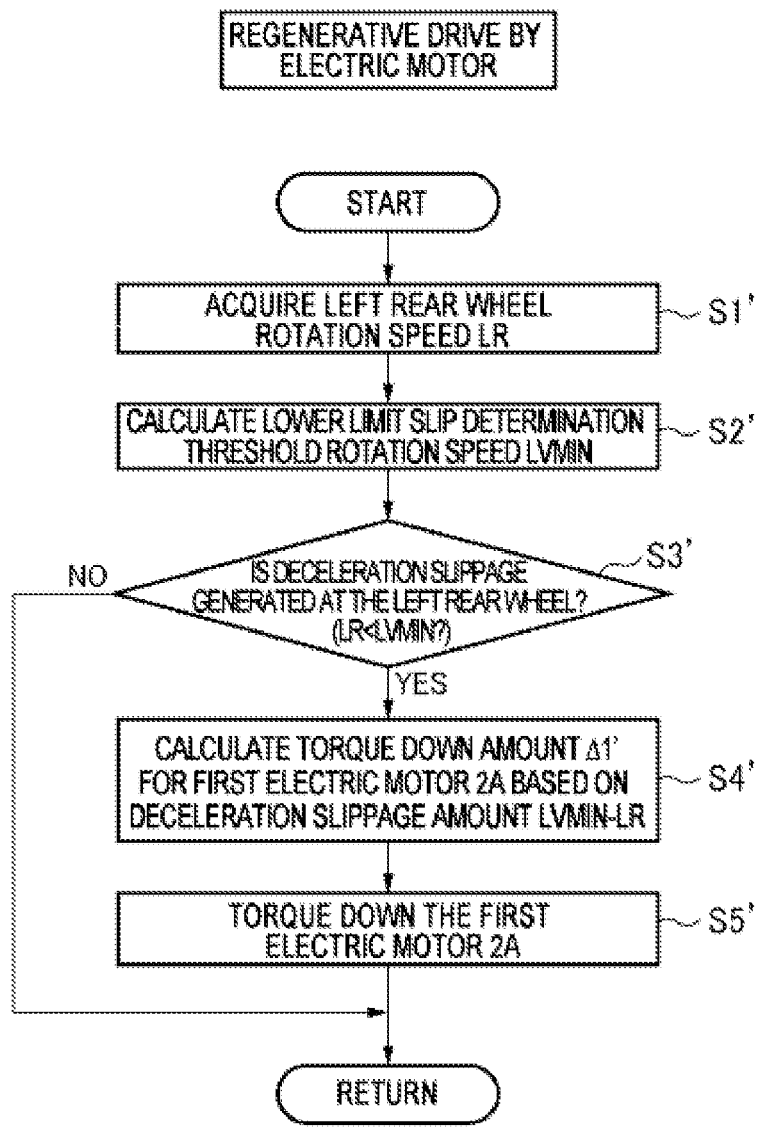
FIG. 14 is an illustration showing a control flow chart for control by motor traction control when an electric motor is regenerating.

Now, the flow of the control of motor traction control is described while referencing FIG. 14 using a case in which braking of the left rear wheel LWr is done by the regeneratively driven first electric motor 2A as an example First, the left rear wheel rotation speed LR is acquired by the wheel speed sensor 13A (S1'), and next, the lower limit slip determination threshold rotation speed LVmin is calculated based on the target rotation speed for the wheel (not illustrated) (S2'). The slip acquisition apparatus 80 compares the left rear wheel rotation speed LR and the lower limit slip determination threshold rotation speed LVmin, and determines if deceleration slippage is or is not being generated at the left rear wheel LWr (S3'). As a result, if the left rear wheel rotation speed LR is at or above the lower limit slip determination threshold rotation speed LVmin (LR≥LVmin), a determination is made that deceleration slippage is not being generated, or that the deceleration slippage is within a range that can be tolerated, and the processing is completed. On the other hand, if the left rear wheel rotation speed LR is less than the lower limit slip determination threshold rotation speed LVmin (LR<LVmin), a determination is made that deceleration slippage (excess slippage) that is at or above a predetermined level that cannot be tolerated has been generated. Then, a command motor torque amount (first change amount Δ1') that should cause a decrease is calculated for the first electric motor 2A connected to the left rear wheel LWr based on the deceleration slippage amount LVmin-LR (S4'). The command motor torque L_CMD of the first electric motor 2A is changed by only the above-mentioned first change amount Δ1' (>0), or in other words, the absolute value of the command motor torque L_CMD of the first electric motor 2A is decreased by only the amount of the absolute value of the first change amount Δ1' (S5'). Through this, a deceleration slippage state of the left rear wheel LWr is quickly resolved, energy consumption is suppressed, and an unstable state of the vehicle 3 can be resolved.

<Left and Right Torque Transfer Control>

In this manner, through the control of motor traction control, an absolute value for the command motor torque values L_CMD and R_CMD for the first electric motor 2A and/or the second electric motor 2B connected to the left rear wheel LWr and/or the right rear wheel RWr where acceleration slippage (deceleration slippage) at or above a predetermined level has been generated is reduced by only an amount of an absolute value of a first change amount Δ1 (Δ1') from a driver requested torque value L_REQ and R_REQ. Therefore, there is a concern that in this way, it could be difficult to transmit a sufficient amount of rear-wheel driving force (rear-wheel braking force) to the road surface.

Therefore, with the rear-wheel drive device 1 of the present disclosure, both left and right torque transfer control is implemented if excess slippage, which is slippage at or above a predetermined level, is generated at one of either the left rear wheel LWr or the right rear wheel RWr. The controller 8 changes the command motor torque L_CMD or R_CMD of the first or second electric motor 2A or 2B connected to the wheel at which excess slippage was generated by only the first change amount Δ1 (Δ1'). Furthermore, the controller 8 also changes the command motor torque L_CMD or R_CMD of the first or second electric motor 2A or 2B connected to the other wheel where excess slippage is not generated by only a second change amount Δ2 (Δ2'), which has a sign that is opposite the first change amount Δ1 (Δ1') and an absolute value that is approximately the same.

(Left and Right Torque Transfer Control During Left and Right Power Driving)

Figure 15:
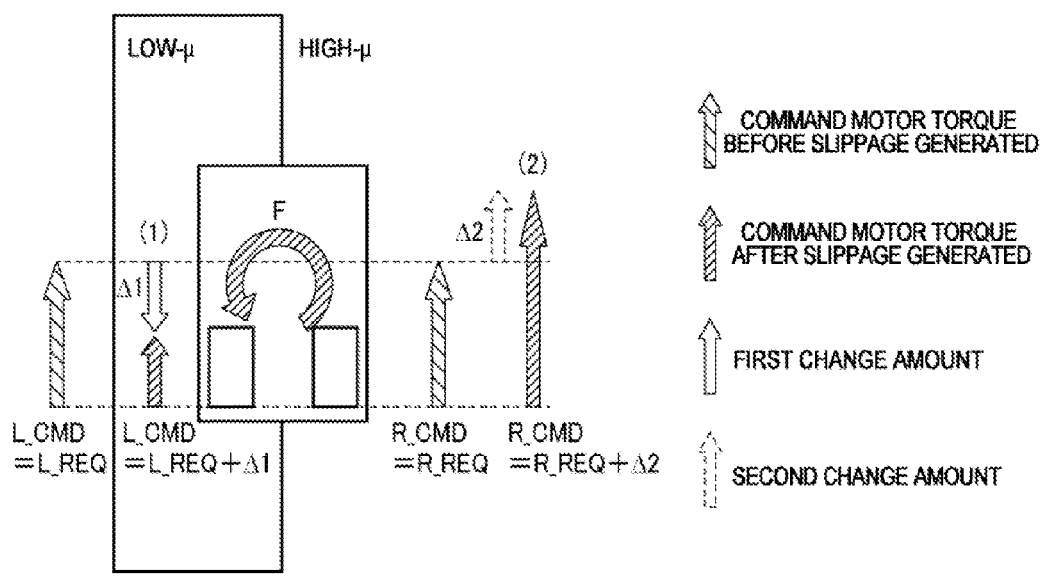
FIG. 15 is an illustration describing left and right torque transfer control for a case in which acceleration slippage is generated at a left rear wheel when both a left wheel and a right wheel are driven by electric motors.

More specifically, as shown in FIG. 15, left and right torque transfer control is described for a case in which acceleration slippage at or above a predetermined level is generated at the left rear wheel LWr when the rear wheels LWr and RWr are driven by the power driven first and second electric motors 2A and 2B on a split-μ road surface, such that the road surface friction at the left side of the vehicle 3 is low-pt, and the road surface friction at the right side of the vehicle 3 is high-pt. Note that before an acceleration slippage at or above a predetermined level is generated at the left rear wheel LWr, the first and second electric motors 2A and 2B output command motor torque values (power drive torque values) L_CMD and R_CMD such that the driver requested torque values L_REQ and R_REQ are satisfied (L_CMD=L_REQ, R_CMD=R_REQ, L_REQ=R_REQ>0).

Figure 16:
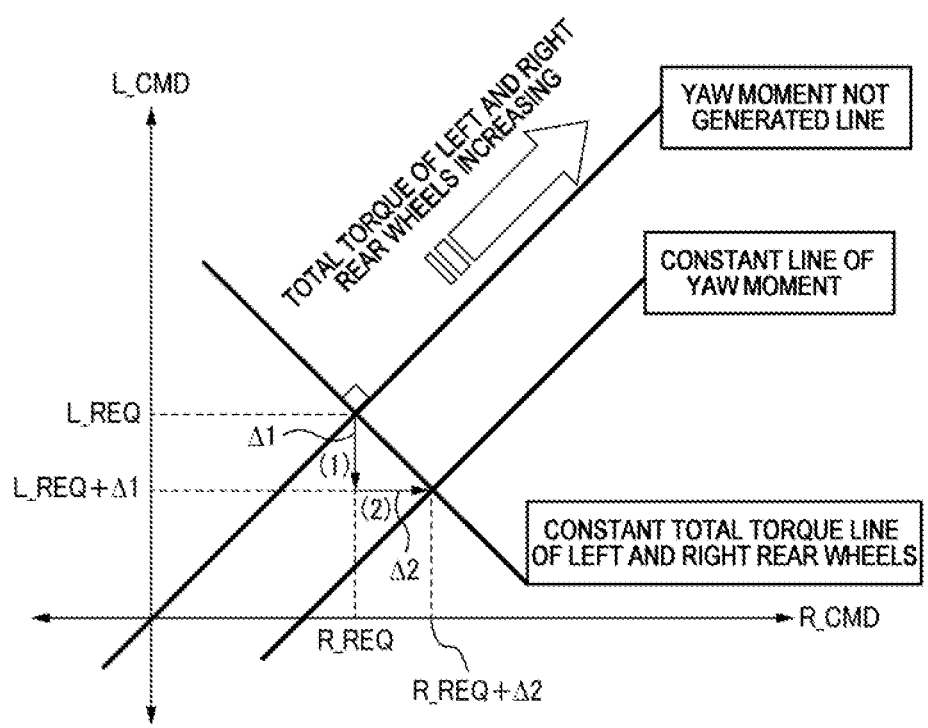
FIG. 16 is an illustration showing a command motor torque of a first and a second electric motor before and after left and right torque transfer control for a case in which acceleration slippage is generated at a left rear wheel when both a left wheel and a right wheel are driven by electric motors.

First, as shown by (1) in FIGS. 15 and 16, the controller 8 changes, through the control of motor traction control, the command motor torque L_CMD of the first electric motor 2A connected to the left rear wheel LWr at which acceleration slippage has been generated by only a first change amount Δ1 from the driver requested torque L_REQ (L_CMD=L_REQ+Δ1, Δ1<0). In other words, the absolute value of the command motor torque L_CMD is decreased by only the amount of the absolute value of the first change amount Δ1.

Moreover, as shown by (2), the controller 8 implements control such that the command motor torque R_CMD of the second electric motor 2B connected to the right rear wheel RWr at which acceleration slippage was not generated is changed through left and right torque transfer control by only a second change amount Δ2, which has a sign that is opposite that of the first change amount Δ1 and an absolute value that is approximately the same (R_CMD=R_REQ+Δ2=R_REQ−Δ1, Δ1<0<Δ2, Δ1=−Δ2). In other words, the absolute value of the command motor torque R_CMD is increased by only the amount of the absolute value of the second change amount Δ2.

Here, the total value of the command motor torque values L_CMD and R_CMD of the first and second electric motors 2A and 2B after the control of motor traction control and left and right torque transfer control is (L_REQ+Δ1)+(R_REQ−Δ1)=L_REQ+R_REQ. There is no change compared to the total value of the command motor torque values L_CMD and R_CMD before the control of motor traction control and left and right torque transfer control (before acceleration slippage). In other words, decreases in the driving torque of the left rear wheel LWr can be supplemented by increases in the driving torque of the right rear wheel RWr, and even on split-μ roads and the like, ample driving torque appropriate for the driver's demands can be transmitted to the road surface.

Note that the left and right difference between the command motor torque values L_CMD and R_CMD before the control of motor traction control and left and right torque transfer control (before slippage) is L_REQ−R_REQ=0. In contrast, the difference thereof after the control of motor traction control and left and right torque transfer control is (L_REQ+Δ1)−(R_REQ−Δ1)=2Δ1, which is larger, and therefore, a yaw moment F rotating counterclockwise is generated in the vehicle 3. However, because the yaw moment F can be adequately tolerated by the driver's steering operations, it does not become a particular problem.

(Left and Right Torque Transfer Control During Left and Right Regeneration)

Figure 17:
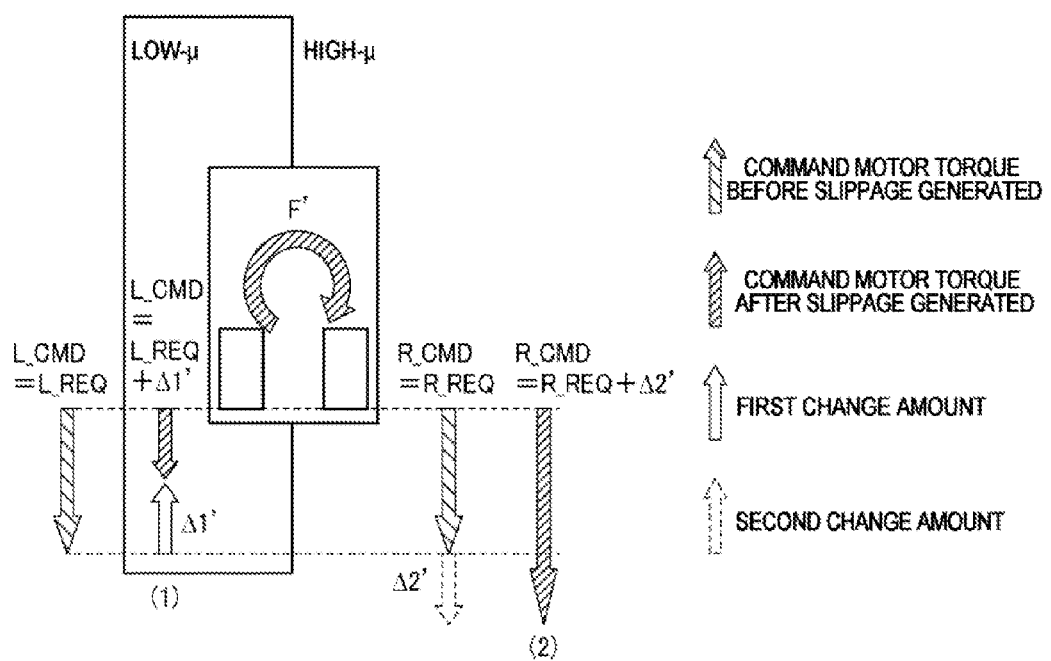
FIG. 17 is an illustration describing left and right torque transfer control for a case in which deceleration slippage is generated at a left rear wheel when both a left wheel and a right wheel are driven by electric motors.

Next, as shown in FIG. 17, left and right torque transfer control is described for a case in which deceleration slippage at or above a predetermined level is generated at the left rear wheel LWr when braking of the rear wheels LWr and RWr is implemented by the regeneratively driven first and second electric motors 2A and 2B on a split-μ road surface, such that the road surface friction at the left side of the vehicle 3 is low-μ, and the road surface friction at the right side of the vehicle 3 is high-μ. Note that before a deceleration slippage at or above a predetermined level is generated at the left rear wheel LWr, the first and second electric motors 2A and 2B output command motor torque values (regenerative driving torque values) L_CMD and R_CMD such that the driver requested torque values L_REQ and R_REQ are satisfied (L_CMD=L_REQ, R_CMD=R_REQ, L_REQ=R_REQ<0).

Figure 18:
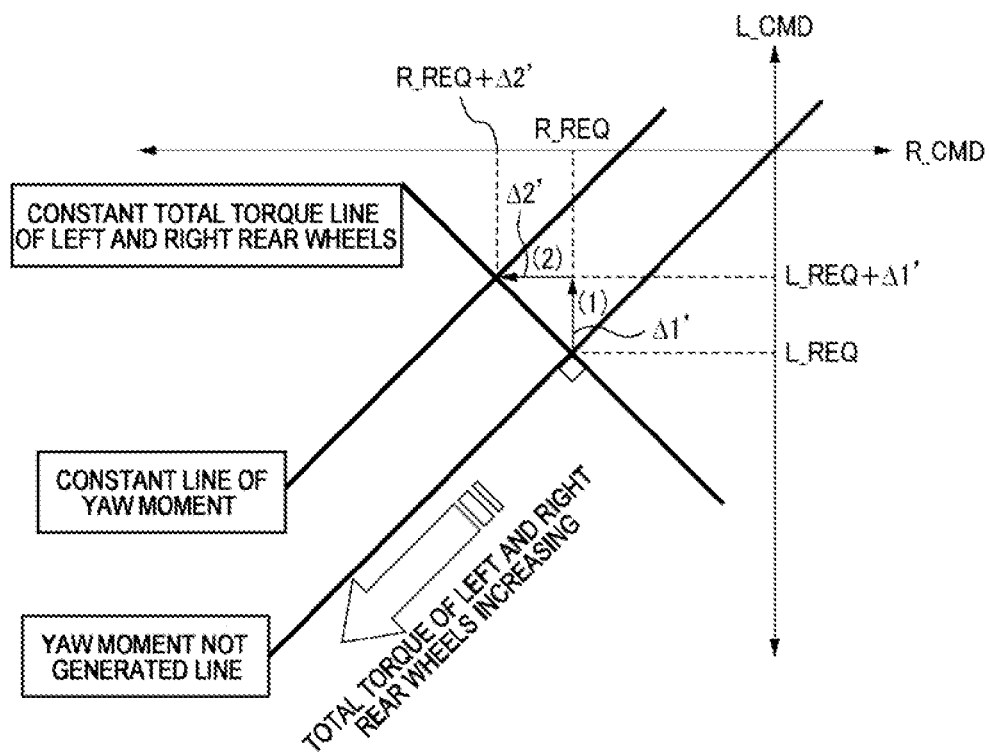
FIG. 18 is an illustration showing a command motor torque of a first and a second electric motor before and after left and right torque transfer control for a case in which deceleration slippage is generated in a left rear wheel when both a left wheel and a right wheel are driven by electric motors.

First, as shown by (1) in FIGS. 17 and 18, the controller 8 changes, through the control of motor traction control, the command motor torque L_CMD of the first electric motor 2A connected to the left rear wheel LWr at which deceleration slippage has been generated by only a first change amount Δ1' from the driver requested torque L_REQ (L_CMD=L_REQ+Δ1', Δ1'>0). In other words, the absolute value of the command motor torque L_CMD is decreased by only the amount of the absolute value of the first change amount Δ1'.

Moreover, as shown by (2), the controller 8 implements control such that the command motor torque R_CMD of the second electric motor 2B connected to the right rear wheel RWr at which deceleration slippage was not generated is changed through left and right torque transfer control by only a second change amount Δ2', which has a sign that is opposite that of the first change amount Δ1' and an absolute value that is approximately the same (R_CMD=R_REQ+Δ2'=R_REQ−Δ1', Δ2'<0<Δ1', Δ1'=−Δ2'). In other words, the absolute value of the command motor torque R_CMD is increased by only the amount of the absolute value of the second change amount Δ2'.

Here, the total value of the command motor torque values L_CMD and R_CMD of the first and second electric motors 2A and 2B after the control of motor traction control and left and right torque transfer control is (L_REQ+Δ1')+(R_REQ−Δ1')=L_REQ+R_REQ. There is no change compared to the total value of the command motor torque values L_CMD and R_CMD before the control of motor traction control and left and right torque transfer control (before deceleration slippage). In other words, decreases in the braking torque of the left rear wheel LWr can be supplemented by increases in the braking torque of the right rear wheel RWr, and even on split-μ roads and the like, ample braking torque appropriate for the driver's demands can be transmitted to the road surface.

Note that the left and right difference between the command motor torque values L_CMD and R_CMD before the control of motor traction control and left and right torque transfer control (before deceleration slippage) is L_REQ−R_REQ=0. In contrast, the difference thereof after the control of motor traction control and left and right torque transfer control is (L_REQ+Δ1')−(R_REQ−Δ1')=2Δ1', which is larger, and therefore, a yaw moment F' rotating clockwise is generated in the vehicle 3. However, because the yaw moment F' can be adequately tolerated by the driver's steering operations, it does not become a particular problem.

(Left and Right Torque Transfer Control During Power Running on Either the Left or Right Side and Regeneration on the Other Side)

Figure 19:
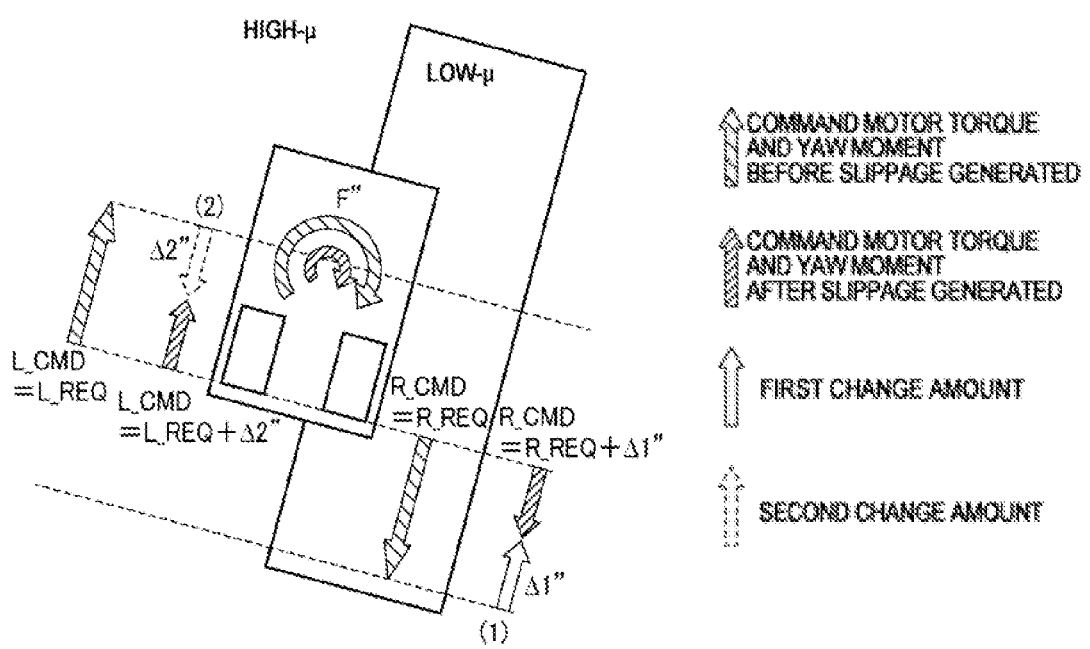
FIG. 19 is an illustration describing left and right torque transfer control for a case in which deceleration slippage is generated at a right rear wheel when both a left wheel and a right wheel are driven and braked by respective electric motors.

Next, as shown in FIG. 19, left and right torque transfer control is described for a case in which deceleration slippage at or above a predetermined level is generated at the right rear wheel RWr when the left rear wheel LWr is driven by the power driven first electric motor 2A and braking of the right rear wheel RWr is implemented by the regeneratively driven second electric motor 2B, such as when turning right, or the like, on a split-μ road surface for which the road surface friction at the right side of the vehicle 3 is low-μ, and the road surface friction at the left side of the vehicle 3 is high-μ. Note that before a deceleration slippage at or above a predetermined level is generated at the right rear wheel RWr, the first and second electric motors 2A and 2B output command motor torque values L_CMD and R_CMD such that the driver requested torque values L_REQ and R_REQ are satisfied (L_CMD=L_REQ, R_CMD=R_REQ, L_REQ=−R_REQ<0).

Figure 20:
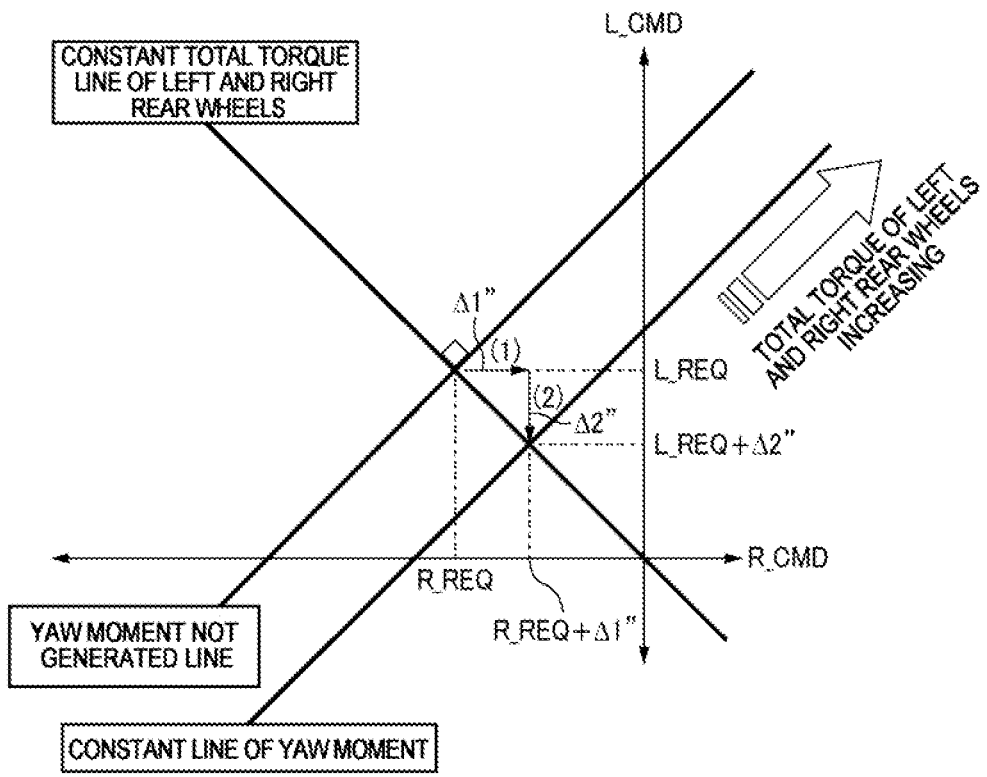
FIG. 20 is an illustration showing a command motor torque of a first and a second electric motor before and after left and right torque transfer control for a case in which deceleration slippage is generated at a right rear wheel when both a left wheel and a right wheel are driven and braked by respective electric motors.

First, as shown by (1) in FIGS. 19 and 20, the controller 8 changes, through the control of motor traction control, the command motor torque R_CMD of the second electric motor 2B connected to the right rear wheel RWr at which deceleration slippage has been generated by only a first change amount Δ1" from the driver requested torque R_REQ (R_CMD=R_REQ+Δ1", Δ1">0). In other words, the absolute value of the command motor torque R_CMD is decreased by only the amount of the absolute value of the first change amount Δ1".

Moreover, as shown by (2), the controller 8 implements control such that the command motor torque L_CMD of the first electric motor 2A connected to the left rear wheel LWr at which slippage was not generated is changed through left and right torque transfer control by only a second change amount Δ2", which has a sign that is opposite that of the first change amount Δ1" and an absolute value that is approximately the same (L_CMD=L_REQ+Δ2"=L_REQ−Δ1", Δ2"<0<Δ1", Δ1"=−Δ2"). In other words, the absolute value of the command motor torque L_CMD is decreased by only the amount of the absolute value of the second change amount Δ2".

Here, the total value of the command motor torque values L_CMD and R_CMD of the first and second electric motors 2A and 2B after the control of motor traction control and left and right torque transfer control is (L_REQ+Δ1")+(R_REQ−Δ1")=L_REQ+R_REQ. There is no change compared to the total value of the command motor torque values L_CMD and R_CMD before the control of motor traction control and left and right torque transfer control (before deceleration slippage). In other words, the driving torque of the left rear wheel LWr can be decreased and tailored to the decrease of the braking torque of the right rear wheel RWr. Therefore, even when turning on split-μ roads and the like, torque appropriate for the driver's demands can be transmitted to the road surface.

Note that the left and right difference between the command motor torque values L_CMD and R_CMD before the control of motor traction control and left and right torque transfer control (before deceleration slippage) is L_REQ−R_REQ. In contrast, the difference thereof after the control of motor traction control and left and right torque transfer control is (L_REQ−Δ1")−(R_REQ+Δ1−)=L_REQ−R_REQ−2Δ1", which is smaller, and therefore, a clockwise rotating yaw moment F" generated in the vehicle 3 can be decreased.

Figure 21:
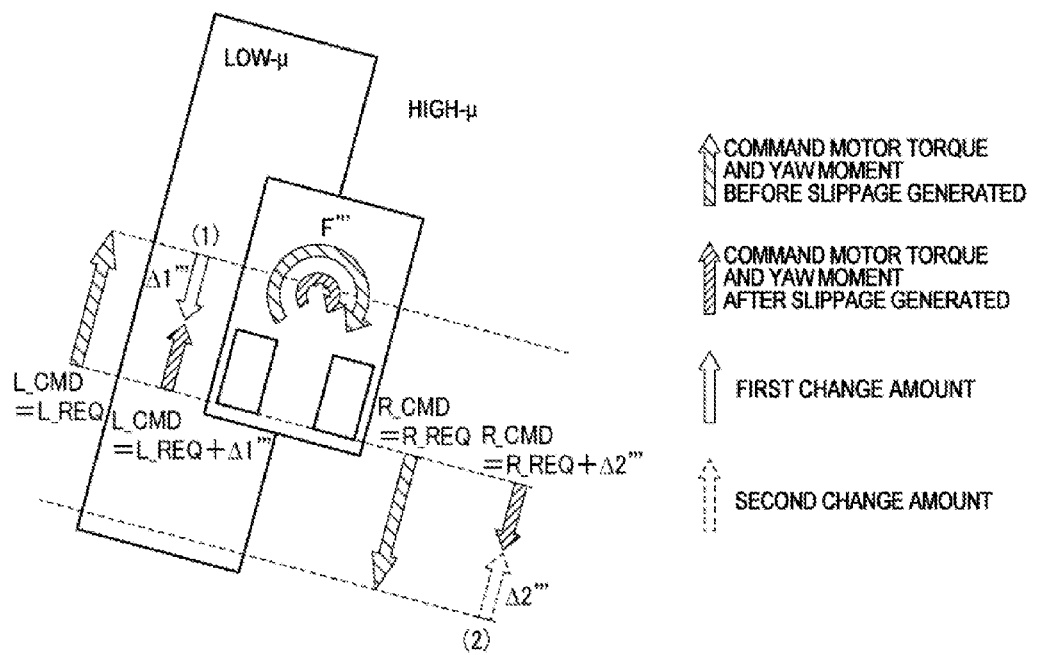
FIG. 21 is an illustration describing left and right torque transfer control for a case in which acceleration slippage is generated at a left rear wheel when both a left wheel and a right wheel are driven and braked by respective electric motors.

Next, as shown in FIG. 21, left and right torque transfer control is described for a case in which acceleration slippage at or above a predetermined level is generated at a left rear wheel LWr when the left rear wheel LWr is driven by a power driven first electric motor 2A and braking of the right rear wheel RWr is implemented by the regeneratively driven second electric motor 2B, such as when turning right, or the like, on a split-μ road surface for which the road surface friction at the left side of the vehicle 3 is low-μ, and the road surface friction at the right side of the vehicle 3 is high-μ. Note that before an acceleration slippage at or above a predetermined level is generated at the left rear wheel LWr, the first and second electric motors 2A and 2B output command motor torque values L_CMD and R_CMD such that the driver requested torque values L_REQ and R_REQ are satisfied (L_CMD=L_REQ, R_CMD=R_REQ, L_REQ=−R_REQ>0).

Figure 22:
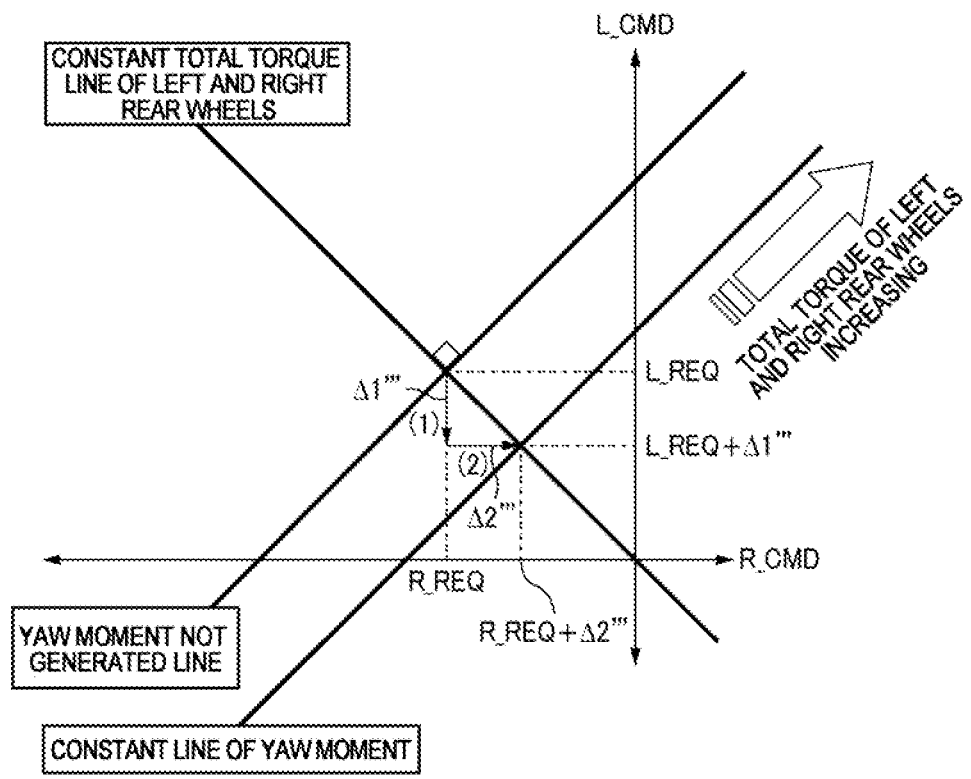
FIG. 22 is an illustration showing a command motor torque of a first and a second electric motor before and after left and right torque transfer control for a case in which acceleration slippage is generated in a left rear wheel when both a left wheel and a right wheel are driven and braked by respective electric motors.

First, as shown by (1) in FIGS. 21 and 22, the controller 8 changes, through the control of motor traction control, the command motor torque L_CMD of the first electric motor 2A connected to the left rear wheel LWr at which acceleration slippage has been generated by only a first change amount Δ1''' from the driver requested torque L_REQ (L_CMD=L_REQ+Δ1''', Δ1'''<0). In other words, the absolute value of the command motor torque L_CMD is decreased by only the amount of the absolute value of the first change amount Δ1'''.

Moreover, as shown by (2), the controller 8 implements control such that the command motor torque R_CMD of the second electric motor 2B connected to the right rear wheel RWr at which slippage was not generated is changed through left and right torque transfer control by only a second change amount Δ1''', which has a sign that is opposite that of the first change amount Δ1''' and an absolute value that is approximately the same (R_CMD=R_REQ+Δ2'''=R_REQ−Δ1''', Δ1'''<0<Δ2''', Δ1'''=−Δ2'''). In other words, the absolute value of the command motor torque R_CMD is decreased by only the amount of the absolute value of the second change amount Δ2'''.

Here, the total value of the command motor torque values L_CMD and R_CMD of the first and second electric motors 2A and 2B after the control of motor traction control and left and right torque transfer control is (L_REQ+Δ1''')+(R_REQ−Δ1''')=L_REQ+R_REQ. There is no change compared to the total value of the command motor torque values L_CMD and R_CMD before the control of motor traction control and left and right torque transfer control (before acceleration slippage). In other words, the braking torque of the right rear wheel RWr can be decreased and tailored to the decrease of the driving torque of the left rear wheel LWr. Therefore, even when turning on split-μ roads and the like, sufficient torque appropriate for the driver's demands can be transmitted to the road surface.

Note that the left and right difference between the command motor torque values L-CMD and R_CMD before the control of motor traction control and left and right torque transfer control (before slippage) is L_REQ−R_REQ. In contrast, the difference thereof after the control of motor traction control and left and right torque transfer control is (L_REQ+Δ1‴)−(R_REQ−Δ1‴)=L_REQ−R_REQ+2Δ1‴, which is smaller, and therefore, a clockwise rotating yaw moment F‴ generated in the vehicle 3 can be decreased.

Figure 23:
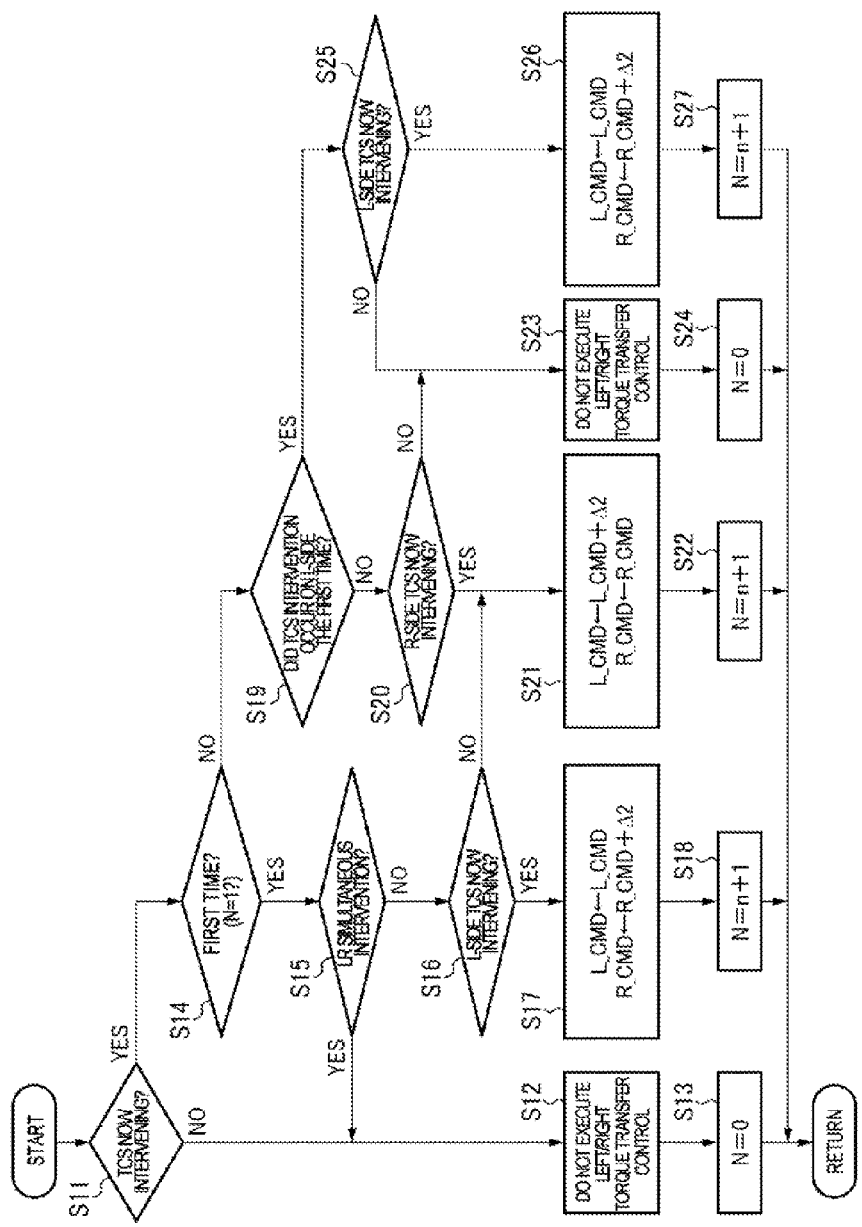
FIG. 23 is an illustration showing a control flow chart for left and right torque transfer control.

Now, the flow of right and left torque transfer control is described using FIG. 23. Following is a description of a control flow using the above-mentioned left and right torque transfer control during left and right power running (see FIGS. 15 and 16) as an example, but the control flow can also be applied to left and right torque transfer control during left and right regeneration (see FIGS. 17 and 18), left and right torque transfer control during power running on either the left or right side and regeneration on the other side (see FIGS. 19 to 22), and the like.

First, a determination is made on whether or not intervention by the control of motor traction control system (M-TCS or TCS) is occurring (S11), and if intervention is not occurring, left and right torque transfer control is not executed (S12), the number of times N of left and right torque transfer control is set to 0 (S13), and a return is made to the start of the process flow.

On the other hand, if intervention by the control of motor traction control is occurring at S11, a determination is made on whether the execution of left and right torque transfer control is occurring for the first time, or in other words, if N=1, or not (S14). If N=1, a determination is made on whether intervention by control of motor traction control is occurring simultaneously at the first and second electric motors 2A and 2B connected to the left and right rear wheels LWr and RWr (S15), and if simultaneous intervention is occurring, left and right torque transfer control is not executed (S12), the number of times N of left and right torque transfer control is set to 0 (S13), and a return is made to the start of the flow chart.

On the other hand, if simultaneous intervention by the control of motor traction control is not occurring at the first and second electric motors 2A and 2B connected to the left and right rear wheels LWr and RWr in S15, a determination is made on whether intervention by control of motor traction control at the first electric motor 2A connected to the left rear wheel LWr is occurring (S16), and if intervention is occurring, the process flow moves on to S17. At S17, control is implemented such that the command motor torque R_CMD of the second electric motor 2B is changed by only a second change amount Δ2 (R_CMD←R_CMD+42). At this time, the command motor torque L_CMD of the first electric motor 2A connected to the left rear wheel LWr is already being changed by only a first change amount Δ1 through control of motor traction control, and therefore, a command that causes a change is not issued here (L_CMD←L_CMD). Next, the number of times N of left and right torque transfer control is set to n+1 in S18, and a return is made to the start of the process flow.

If intervention by the control of motor traction control is not occurring at the first electric motor 2A connected to the left rear wheel LWr in S16, or in other words, if intervention by the control of motor traction control is occurring at the second electric motor 2B connected to the right rear wheel RWr, the process flow moves on to S21. Moreover, control is implemented such that the command motor torque L_CMD of the first electric motor 2A connected to the left rear wheel LWr is changed by only a second change amount Δ2 (L_CMD←L_CMD+Δ2). At this time, the command motor torque R_CMD of the second electric motor 2B connected to the right rear wheel RWr is already being changed by only the first change amount Δ1 through control of motor traction control, and therefore, a command that causes a change is not issued here (R_CMD←R_CMD). Next, the number of times N of left and right torque transfer control is set to n+1 in S22, and a return is made to the start of the process flow.

If left and right torque transfer control is not occurring for the first time in S14 (N≠1), the process flow moves on to S19, and a determination is made on whether or not intervention by control of motor traction control occurred at the first electric motor 2A connected to the left rear wheel LWr during the first time (N=1) of intervention. Moreover, if intervention by control of motor traction control is not occurring at the first electric motor 2A, a determination is made in S20 on whether or not intervention by control of motor traction control is now occurring at the second electric motor 2B connected to the right rear wheel RWr, and if such intervention is now occurring, the control described above for S21 and S22 is implemented. On the other hand, if intervention by control of motor traction control is not currently occurring at the second electric motor 2B connected to the right rear wheel RWr in S20, left and right torque transfer control is not executed (S23), the number of times N of left and right torque transfer control is set to 0 (S24), and a return is made to the start of the process flow.

If intervention by control of motor traction control occurred at the first electric motor 2A connected to the left rear wheel LWr during the first time (N=1) of intervention at S19, a determination is made in S25 on whether or not intervention by control of motor traction control is now occurring at the first electric motor 2A connected to the left rear wheel LWr, and if such intervention is not now occurring, the control described above for S23 and S24 is implemented. On the other hand, if intervention by control of motor traction control is now occurring at the first electric motor 2A connected to the left rear wheel LWr at S25, control is implemented at S26 such that the command motor torque R_CMD of the second electric motor 2B connected to the right rear wheel RWr is changed by only the second change amount Δ2 (R_CMD←R_CMD+Δ2). At this time, the command motor torque L_CMD of the first electric motor 2A connected to the left rear wheel LWr is already being changed by only a first change amount Δ1 through control of motor traction control, and therefore, a command that causes a change is not issued here (L_CMD←L_CMD). Next, the number of times N of left and right torque transfer control is set to n+1 at S27, and a return is made to the start of the process flow.

As explained above, according to a rear-wheel drive device 1 of the present embodiment, when both the left rear wheel LWr and the right rear wheel RWr are driven by first and second electric motors 2A and 2B, and acceleration slippage occurs at either the left wheel LWr or the right wheel RWr, the acceleration slippage is reduced by decreasing the command motor torque L_CMD or R_CMD (power drive torque) of the first or second electric motor 2A or 2B connected to the wheel at which acceleration slippage was generated. The command motor torque L_CMD or R_CMD of the first or second electric motor 2A or 2B connected to the other wheel (wheel on the other side) on the right or left side that is opposite the wheel at which slippage occurred is increased, thereby making it possible to supplement the decrease in the driving torque of the wheel at which slippage occurred. Accordingly, because ample drive torque appropriate for the driver's demands can be transmitted to the road surface even on split-μ roads or the like, driving performance can be maintained, and an unnecessary sense of deceleration felt by the passengers is eliminated.

When both the left wheel LWr and the right wheel RWr are braked by the first and second electric motors 2A and 2B, and deceleration slippage has been generated at either the left wheel LWr or the right wheel RWr, the deceleration slippage is reduced by decreasing the absolute value of the command motor torque L_CMD or R_CMD (regenerative driving torque) of the first or second electric motor 2A or 2B connected to the wheel at which deceleration slippage occurred. The absolute value of the regenerative driving torque of the first or second electric motor 2A or 2B connected to the other wheel (wheel on the other side) on the right or left side that is opposite the wheel at which slippage occurred is increased, thereby making it possible to supplement the decrease in the braking torque of the wheel at which slippage occurred.

When both the left wheel LWr and the right wheel RWr are driven and braked by the first and second electric motors 2A and 2B, and deceleration slippage has been generated at either the left rear wheel LWr or the right rear wheel RWr, the deceleration slippage is reduced by decreasing the absolute value of the command motor torque L_CMD or R_CMD (regenerative driving torque) of the first or second electric motor 2A or 2B connected to the wheel at which deceleration slippage occurred. The absolute value of the command motor torque L_CMD or R_CMD (power drive torque) of the first or second electric motor 2A or 2B connected to the other wheel (wheel on the other side) on the right or left side that is opposite the wheel at which slippage occurred is decreased, thereby enabling tailoring to the decrease in braking torque of the wheel at which slippage occurred. Moreover, the yaw moment generated at the vehicle 3 can also be reduced.

When both the left wheel LWr and the right wheel RWr are driven and braked by the first and second electric motors 2A and 2B, and acceleration slippage has been generated at either the left rear wheel LWr or the right rear wheel RWr, the acceleration slippage is reduced by decreasing the absolute value of the command motor torque L_CMD or R_CMD (power driving torque) of the first or second electric motor 2A or 2B connected to the wheel at which acceleration slippage occurred. The absolute value of the command motor torque L_CMD or R_CMD (regenerative driving torque) of the first or second electric motor 2A or 2B connected to the other wheel (wheel on the other side) on the right or left side that is opposite the wheel at which slippage occurred is decreased, thereby enabling tailoring to the decrease in driving torque of the wheel at which slippage occurred. Moreover, the yaw moment generated at the vehicle can also be reduced.

Consequently, according to the rear-wheel drive device 1 of the present embodiment, the command motor torque L_CMD or R_CMD of the first or second electric motor 2A or 2B connected to the wheel at which slippage occurred is changed by only a first change amount $\Delta 1$ ($\Delta 1'$, $\Delta 1''$, $\Delta 1'''$), and the command motor torque L_CMD or R_CMD of the first or second electric motor 2A or 2B connected to the other wheel (wheel on the other side) on the right or left side that is opposite the wheel at which slippage occurred is changed by only a second change amount $\Delta 2$ ($\Delta 2'$, $\Delta 2''$, $\Delta 2'''$), which has the opposite sign as the first change amount $\Delta 1$ ($\Delta 1'$, $\Delta 1''$, $\Delta 1'''$) and an absolute value that is approximately the same. Accordingly, the total value of the command motor torque values L_CMD and R_CMD of the first and second electric motors 2A and 2B connected to the left wheel LWr and the right wheel RWr does not change when compared to before and after slippage, and therefore, an excess or deficiency of driving force or braking force of the left wheel LWr and the right wheel RWr can be reliably suppressed.

Note that the present disclosure is not limited to the embodiments described above, and appropriate modifications, enhancements, or the like, are possible.

For example, in the above-mentioned embodiment, the command motor torque L_CMD or R_CMD of the first or second electric motor 2A or 2B connected to the wheel at which slippage occurred is changed by only a first change amount $\Delta 1$ ($\Delta 1'$, $\Delta 1''$, $\Delta 1'''$), and the command motor torque L_CMD or R_CMD of the first or second electric motor 2A or 2B connected to the other wheel (wheel on the other side) on the right or left side that is opposite the wheel at which slippage occurred is changed by only a second change amount $\Delta 2$ ($\Delta 2'$, $\Delta 2''$, $\Delta 2'''$), which has the opposite sign as the first change amount $\Delta 1$ and an absolute value that is approximately the same ($\Delta 1 = -\Delta 2$, $\Delta 1' = -\Delta 2'$, $\Delta 1'' = -\Delta 2''$, or $\Delta 1''' = -\Delta 2'''$). However, the absolute values of the first change amount $\Delta 1$ ($\Delta 1'$, $\Delta 1''$, $\Delta 1'''$) and of the second change amount $\Delta 2$ ($\Delta 2'$, $\Delta 2''$, $\Delta 2'''$) do not necessarily have to be approximately the same, and at the very least, the signs only need to be opposite $\Delta 1 \times \Delta 2 < 0$, $\Delta 1' \times \Delta 2' < 0$, $\Delta 1'' \times \Delta 2'' < 0$, or $\Delta 1''' \times \Delta 2''' < 0$).

The above-mentioned control of motor traction control may also be performed by comparing the motor rotation speeds of the first and second electric motors 2A and 2B acquired by the resolvers 20A and 20B with the upper limit slip determination threshold rotation speeds of the first and second electric motors 2A and 2B determined based on the motor target rotation speed. For example, when the rear wheels LWr and RWr are driven by the power driven first and second electric motors 2A and 2B, if the motor rotation speeds of the first and second electric motors 2A and 2B are at or below the upper limit slip determination threshold rotation speeds, the controller 8 causes command motor torque values L_CMD and R_CMD to be output to the first and second electric motors 2A and 2B such that the driver requested torque values L_REQ and R_REQ are satisfied. If the rotation speeds of the first and second electric motors 2A and 2B exceed the upper limit slip determination threshold rotation speeds, a determination is made that acceleration slippage at or above a predetermined level has occurred at the rear wheels LWr and RWr. Then, the controller 8 changes the command motor torque values L_CMD and R_CMD of the first electric motor 2A and/or the second electric motor 2B connected to the left rear wheel LWr and/or the right rear wheel RWr where acceleration slippage has occurred by only a first change amount determined based on the amount of acceleration slippage, which is the difference between the upper limit slip determination threshold rotation speed and the motor rotation speed, and acceleration slippage is suppressed.

Respective hydraulic brakes 60A and 60B do not have to be provided for the ring gears 24A and 24B, and a single hydraulic brake and a single one-way clutch may be provided for the interlocked ring gears 24A and 24B. Moreover, either a hydraulic brake or a one-way clutch may be provided as a device or apparatus to transmit drive power.

In addition, a hydraulic brake was illustrated as a connection/disconnection apparatus, but the present disclosure is not limited thereto, and a mechanical system, an electromagnetic system, or the like, can be freely selected. Moreover, in the left wheel drive device and the right wheel drive device, a planetary gear type speed reducer was disposed between the electric motor and the wheel, but any transmission may be used in place of the planetary gear type speed reducer. As long as a drive power transmission apparatus that enables drive power transmission between the electric motor and the wheel to be connected and disconnected is provided on the drive power transmission pathway between the electric motor and the wheel, the transmission can also be omitted.

Although, an electric motor was illustrated as the drive source, an engine or another drive source may also be used. Moreover, in the embodiment described above, resolvers 20A and 20B are respectively provided at the first and second electric motors 2A and 2B as a first apparatus for detecting a rotation state amount. However, the first apparatus for detecting a rotation state amount may be disposed farther toward the side of the first and second electric motors 2A and 2B than the drive power transmission apparatus, on the drive power transmission pathway between the first and second electric motors 2A and 2B and the rear wheels Wr.

Similarly, in the embodiment described above, wheel speed sensors 13A and 13B are respectively provided at the left rear wheel LWr and the right rear wheel RWr as a second apparatus for detecting a rotation state amount. However, the second apparatus for detecting a rotation state amount may be disposed farther toward the side of the wheels Wr than the drive power transmission apparatus, on the drive power transmission pathway between the first and second electric motors 2A and 2B and the rear wheels Wr.

What is claimed is:

1. A vehicle drive device comprising:
a left electric motor connected to a left wheel of a vehicle;
a right electric motor connected to a right wheel of the vehicle; and
an electric motor controller that controls a torque of the left electric motor and a torque of the right electric motor,
wherein a generation of an excess slippage occurs above a predetermined amount of either the left wheel or the right wheel, the electric motor controller changes the torque of the electric motor connected to the wheel at which the excess slippage occurred by only a first change amount, and also changes the torque of the other electric motor connected to the other wheel by only a second change amount having a sign that is opposite the first change amount, the first change amount and the second change amount having absolute values that are approximately the same, and
wherein when shifting the torque of the left electric motor and the torque of the right electronic motor, a torque difference of the left electric motor and the right electric motor is changed and a total sum of torque of the left electric motor and the right electric motor does not change before and after the shift.

2. The vehicle drive device according to claim 1, wherein the first change amount and second change amount are applied to a user requested torque.

3. The vehicle drive device according to claim 1, wherein a yaw moment is reduced.

4. The vehicle drive device according to claim 1, wherein the electric motor controller does not change the torque of the left and right electric motors when the excess slippage is below the predetermined amount.

5. The vehicle drive device according to claim 1, wherein the left wheel is a rear left wheel and the right wheel is a rear right wheel.

6. A vehicle drive device comprising:
a first motor connected to a first wheel on a first side of a vehicle;
a second motor connected to a second wheel on a second side of the vehicle; and
a motor controller that controls a torque of the first motor and a torque of the second motor,
wherein when a generation of slippage at the first wheel is above a predetermined amount, the motor controller decreases an absolute value of the torque of the first motor connected to the first wheel, and increases an absolute value of the torque of the second motor connected to the second wheel, and
wherein when shifting the torque of the first motor and the torque of the second motor, a torque difference of the first motor and the second motor is changed and a total sum of torque of the first motor and the second motor does not change before and after the shift.

7. The vehicle drive device according to claim 6, wherein the motor controller generates approximately same change amount values for the absolute value of the torque that is decreased and the absolute value of the torque that is increased.

8. The vehicle drive device according to claim 7, wherein the change amount values are applied to a user requested torque.

9. The vehicle drive device according to claim 6, wherein the motor controller does not change the torque of the first and second motors when the slippage is below the predetermined amount.

10. The vehicle drive device according to claim 6, wherein when the slippage is an acceleration slippage above the predetermined amount and the first wheel is driving and the second wheel is braking, the motor controller decreases the absolute value of the torque of the first motor connected to the first wheel, and decreases the absolute value of the torque of the second motor connected to the second wheel.

11. The vehicle drive device according to claim 6, wherein when the slippage is a deceleration slippage above the predetermined amount and the first wheel is driving and the second wheel is braking, the motor controller decreases the absolute value of the torque of the first motor connected to the first wheel, and decreases the absolute value of the torque of the second motor connected to the second wheel.

12. A method for controlling motor traction by a motor controller comprising:
calculating a slippage of a first wheel connected to a first motor and a second wheel connected to a second motor;
determining whether the slippage of the first wheel exceeds a predetermined amount;
changing a torque by a first amount in the first wheel when the slippage exceeds the predetermined amount in the first wheel;
changing a torque in the second wheel by a second amount having an opposite sign of the first amount; and
setting the first amount and the second amount to have approximately a same absolute value,
wherein when shifting the torque of the first motor and the torque of the second motor, a torque difference of the first motor and the second motor is changed and a total sum of torque of the first motor and the second motor does not change before and after the shift.

13. The method of claim 12, wherein the first amount and second amount are applied to a user requested torque.

14. The method of claim 13, further comprising
calculating a next slippage of the first wheel;
determining whether the next slippage exceeds the predetermined amount; and
reverting back to the user requested torque when the next slippage does not exceed the predetermined amount.

15. The method of claim 14, further comprising adjusting the torque to the first wheel by a third amount when the next slippage exceeds the predetermined amount and then adjusting the torque to the second wheel by a fourth amount having an opposite sign to the third amount.

16. The method of claim 15, further comprising setting the third amount and the fourth amount to have approximately a same absolute value.

17. The method of claim 12, further comprising maintaining driving performance without unnecessary sense of deceleration to passengers.

18. The method of claim 12, further comprising reducing a yaw moment.

* * * * *